US005683662A

United States Patent [19]
Hollinger, Jr.

[11] Patent Number: 5,683,662
[45] Date of Patent: *Nov. 4, 1997

[54] ARTICLE AND METHOD FOR ARCHIVAL PRESERVATION WITH AN ORGANOPHILIC, HYDROPHOBIC OR ACID-RESISTANT MOLECULAR SIEVE

[75] Inventor: William K. Hollinger, Jr., McLean, Va.

[73] Assignee: Conservation Resources International, Inc., Springfield, Va.

[*] Notice: The term of this patent shall not extend beyond the expiration date of Pat. No. 5,633,054.

[21] Appl. No.: 460,883

[22] Filed: Jun. 5, 1995

Related U.S. Application Data

[60] Division of Ser. No. 149,399, Nov. 9, 1993, Pat. No. 5,525,296, which is a continuation-in-part of Ser. No. 32,076, Mar. 16, 1993, which is a continuation-in-part of Ser. No. 860,078, Mar. 30, 1992.

[51] Int. Cl.$^6$ .................................................. B01J 19/00
[52] U.S. Cl. ......................... 422/291; 428/534; 428/480; 428/34.2
[58] Field of Search ..................................... 428/534, 535, 428/480, 481, 34.2, 34.3; 422/291

[56] References Cited

U.S. PATENT DOCUMENTS

| | | |
|---|---|---|
| 827,863 | 8/1906 | Greenstreet . |
| 1,019,589 | 5/1912 | Beadell . |
| 1,042,801 | 10/1912 | Kitsee . |
| 1,121,919 | 12/1914 | Griffey et al. . |
| 1,231,945 | 7/1917 | Rupert . |
| 1,346,349 | 7/1920 | Tate . |
| 1,595,416 | 8/1926 | Rafsky . |
| 1,598,104 | 8/1926 | Rafsky . |
| 1,614,753 | 1/1927 | Moyer . |
| 1,726,573 | 9/1929 | Lang . |
| 1,740,351 | 12/1929 | Isobe . |
| 1,741,921 | 12/1929 | Davenport . |
| 1,914,526 | 6/1933 | Rafton . |
| 1,918,109 | 7/1933 | Joyce . |
| 1,976,744 | 10/1934 | Rafton . |
| 2,060,824 | 11/1936 | Rafton . |

(List continued on next page.)

FOREIGN PATENT DOCUMENTS

| | | |
|---|---|---|
| 115586 A1 | 8/1984 | European Pat. Off. . |
| 678636 | 10/1991 | Switzerland . |
| 1007981 | 10/1965 | United Kingdom . |
| 2208397 | 3/1989 | United Kingdom . |
| WO 91/14496 | 10/1991 | WIPO . |

OTHER PUBLICATIONS

"Beyond Zeolites: Mesoporous Materials," Science News, 143:44 (1993).
Parks, et al., "Studies on the Degradation Products of Paper With and Without Pollutants in a Closed Environment," NISTIR 4456, U.S. Department of Commerce, issued Dec. 1990.
Tulsi Ram, "Molecular Sieves: Antidote to Vinegar Syndrome," AMIA Newsletter, No. 19, Mar. 1933.
A. Tulsi Ram et al., "The Effects and Prevention of the 'Vinegar Syndrome,'" Eastman Kodak Co., presented in part at the NAPM/ANSI IT9–2 Color subcommittee on Nov. 17, 1992 and at the AMIA conference in San Francisco, CA on Dec. 10, 1992.
Patent Abstracts of Japan, vol. 016197, publication No. JP4029232, abstract publication date May 12, 1992.

*Primary Examiner*—Timothy McMahon
*Attorney, Agent, or Firm*—Finnegan, Henderson, Farabow, Garrett & Dunner, L.L.P.

[57] ABSTRACT

A preservation article for the preservation of an archival article, wherein the preservation article includes a molecular sieve which is organophilic, hydrophobic or acid-resistant. A method of preserving an archival article which involves providing a preservation article in proximity to an archival article, wherein the preservation article includes a molecular sieve which is organophilic, hydrophobic or acid-resistant. The preservation article may be coated on or incorporated into a container, a packaging material, a support for an archival article or the archival article itself.

63 Claims, 9 Drawing Sheets

U.S. PATENT DOCUMENTS

| | | |
|---|---|---|
| 2,080,066 | 5/1937 | Sheppard et al. . |
| 2,178,606 | 11/1939 | Plumstead . |
| 2,202,742 | 5/1940 | McCorkhill . |
| 2,242,087 | 5/1941 | Plumstead . |
| 2,278,295 | 3/1942 | Wilson . |
| 2,933,455 | 4/1960 | Doying . |
| 2,985,553 | 5/1961 | Anderson . |
| 3,326,810 | 6/1967 | Dolan et al. . |
| 3,567,645 | 3/1971 | Dultz . |
| 3,592,674 | 7/1971 | Maskal et al. . |
| 3,597,251 | 8/1971 | Kaufman . |
| 3,607,777 | 9/1971 | Winyall et al. . |
| 3,671,310 | 6/1972 | Brown et al. . |
| 3,770,577 | 11/1973 | Humphrey . |
| 3,870,596 | 3/1975 | Asadea et al. . |
| 3,898,356 | 8/1975 | Williams et al. . |
| 4,093,105 | 6/1978 | Russell et al. . |
| 4,153,505 | 5/1979 | Ferguson . |
| 4,154,363 | 5/1979 | Barthel . |
| 4,207,366 | 6/1980 | Tyler . |
| 4,240,870 | 12/1980 | Shibazaki et al. . |
| 4,263,094 | 4/1981 | Login et al. . |
| 4,283,450 | 8/1981 | Luck et al. . |
| 4,441,953 | 4/1984 | Hollinger, Jr. . |
| 4,489,112 | 12/1984 | Wise et al. . |
| 4,489,120 | 12/1984 | Hollinger, Jr. . |
| 4,606,503 | 8/1986 | Bleeck . |
| 4,606,790 | 8/1986 | Youngs et al. . |
| 4,610,801 | 9/1986 | Matthews et al. . |
| 4,636,392 | 1/1987 | Toshitsugu . |
| 4,685,563 | 8/1987 | Cohen et al. . |
| 4,711,702 | 12/1987 | Hood . |
| 4,753,832 | 6/1988 | Brown et al. . |
| 4,769,274 | 9/1988 | Tellvik et al. . |
| 4,798,290 | 1/1989 | Bradford . |
| 4,806,398 | 2/1989 | Martin, Jr. . |
| 4,835,025 | 5/1989 | Thompson et al. . |
| 4,861,632 | 8/1989 | Caggiano . |
| 4,921,733 | 5/1990 | Gibbons et al. . |
| 4,927,705 | 5/1990 | Syme et al. . |
| 4,940,612 | 7/1990 | Gibbons et al. . |
| 5,008,137 | 4/1991 | Nugent, Jr. et al. . |
| 5,048,262 | 9/1991 | Kakuda . |
| 5,055,161 | 10/1991 | Hoffman . |
| 5,061,345 | 10/1991 | Hoffman . |
| 5,096,539 | 3/1992 | Allan . |
| 5,215,192 | 6/1993 | Ram et al. . |

FIG. 4
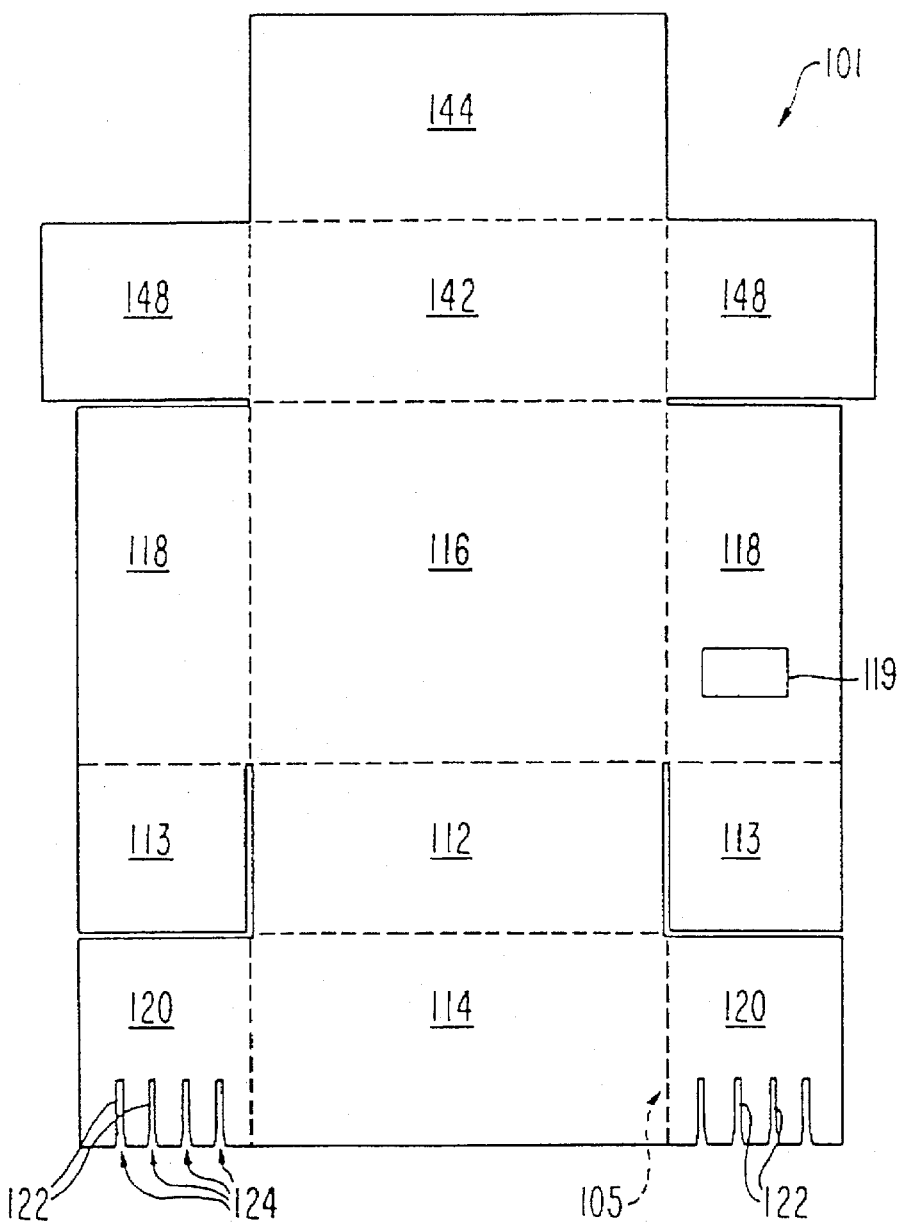
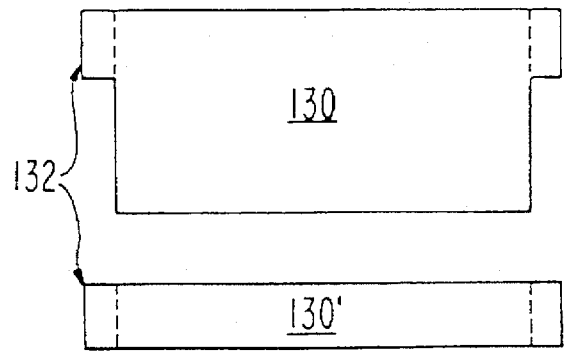

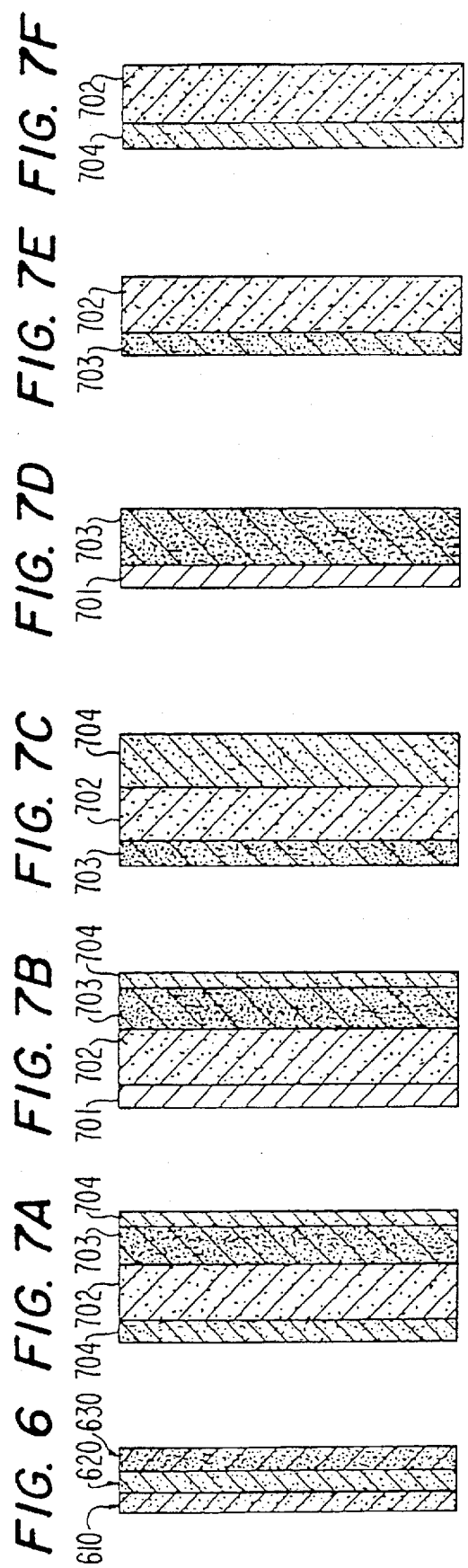

ARTICLE AND METHOD FOR ARCHIVAL PRESERVATION WITH AN ORGANOPHILIC, HYDROPHOBIC OR ACID-RESISTANT MOLECULAR SIEVE

This is a divisional application of Ser. No. 08/149,399, filed Nov. 9, 1993 now U.S. Pat. No. 5,525,296, which is a continuation-in-part application of U.S. patent application Ser. No. 08/032,076 filed Mar. 16, 1993, which is a continuation-in-part application of U.S. patent application Ser. No. 07/860,078 filed Mar. 30, 1992. The contents of these applications are relied on and incorporated herein by reference.

This invention relates to a preservation article and a method for preserving an archival article. More specifically, this invention relates to a preservation article having a molecular sieve which has the characteristic(s) of being organophilic, hydrophobic, and/or acid-resistant and a method of using the preservation article to preserve an archival article.

BACKGROUND OF THE INVENTION

Archival articles are generally defined as objects of historical, aesthetic or sentimental significance, such as papers and photographs. Several attempts have been made to protect archival articles from the deleterious effects of impurities in the environment.

For, example, previous attempts have been made to protect archival articles by storing them in containers designed to protect the archival articles from the deleterious effects of both impurities outside of the container and from residual chemicals within the container material. Cardboard containers have been coated with an acid in order to protect the contents of the container from alkaline fumes emitted from the adhesive used in container construction or sealing. Other containers have an inner layer incorporating an organic amide and an inorganic metal nitrate which inhibits metal corrosion.

Additionally, packages have been designed for photographic film in which a container or wrapping is substantially free from sulfur, ammonia, and turpentine. Such a package may also have a black, opaque outer layer and an inner layer which is inert towards light-sensitive, photographic emulsions.

Boxboards are also known which include a first layer of paperboard consisting of non-buffered, substantially pure alpha-cellulose and an alkaline size, a second layer of a paperboard comprising alpha-cellulose, an alkaline buffer and an alkaline size and, intermediate said first and second layers, a layer of water-impermeable plastic. The alkaline components may neutralize the acidic impurities in the environment of the archival article. The inner layer of the boxboard may be nonbuffered in order to avoid damage to the contents of containers made from the boxboard.

However, the previous methods have not been sufficient to protect archival articles from all of the impurities in the environment of the archival article. A wide variety of compounds are known to damage archival articles. For example, airborne pollutants from the surrounding atmosphere and the various by-products of deteriorating archival articles may contact and damage an archival article. Oxides of nitrogen, for instance, may combine with moisture to form pollutants, such as nitric acid, which may contact and damage artifacts, such as photographs. Sulfur compounds may cause silver images, e.g in photographs, microfilm, and microfiche, to fade by converting the metallic silver in the photographic layers to silver sulfide. Acids can also contact and damage photographs by bleaching and fading the silver image and causing the paper and gelatin support to become brittle. Peroxides, in concentrations as low as one part in thirty million, may also cause image oxidation and fading.

Previous studies have also detected degradation products from the archival articles themselves which may further damage archival articles. The degradation products may be mobile and may be transferred from one paper to another by surface or gas phase diffusion. Deterioration may also produce by-products such as organic acids, low molecular weight ketones, aldehydes and phenols.

Further, it has been observed that the configuration of the container may also contribute to the damage and deterioration of the archival article. For example, if a container used for the long term storage of archival documents is only partially filled, the archival documents stored inside the container will have a tendency to slide across the bottom of the container and assume a curved shape. Over a period of time, this results in permanent deformation of the documents in a curled condition which makes them subject to cracking when further shifting occurs or when the documents are removed from the container, thus accelerating the deterioration process. In the past, attempts to prevent this curled condition have included stuffing crumpled paper in the open space of the container to maintain the documents in a flat condition and to prevent them from sliding.

SUMMARY OF THE INVENTION

The invention is directed to a preservation article and a method of preserving an archival article and substantially obviates one or more of the problems incurred due to limitations and disadvantages of the related art.

The inventor has observed that the stored archival articles themselves produce various by-products of deterioration which may be trapped in the storage container and accelerate the deterioration process. Moreover, various harmful pollutants are able to pass through conventional archival boxboards, and their entry is not prevented by alkaline materials contained in such boxboards. Although preservation papers of the prior art may absorb some pollutants, they may later release the pollutants or their by-products which then contact and damage the archival articles.

Accordingly, the invention is also directed to a preservation article and method of preserving archival articles which effectively removes both acids and other impurities or by-products having various molecular sizes from the environment of an archival article.

The invention provides a preservation article which involves a molecular sieve which has the characteristic(s) of being organophilic, hydrophobic, and/or acid-resistant for the preservation of an archival article.

The invention also provides a method of preserving an archival article which involves providing a preservation article in proximity to an archival article, wherein the preservation article includes a molecular sieve which has the characteristic(s) of being organophilic, hydrophobic, and/or acid-resistant. The preservation article may be incorporated into a container, a packaging material, a support for an archival article or the archival article itself.

The invention is also directed to a container which will permit the long term storage of archival articles, such as documents, and prevents the shifting of the archival articles in the container.

Additional features and advantages of the invention will be set forth in the description which follows, and in part will be apparent from the description, or may be learned by practice of the invention. The objectives and advantages of the invention may be realized and obtained by means of the materials and methods particularly pointed out in the written description and claims hereof as well as the appended drawings.

DETAILED DESCRIPTION OF THE INVENTION

To achieve these and other advantages and in accordance with the purpose of the invention as embodied and broadly described herein, a preservation article which includes a molecular sieve which has the characteristic(s) of being organophilic, hydrophobic, and/or acid-resistant is used to preserve an archival article.

For the purposes of this specification and the appended claims, all parts and percentages are by weight unless otherwise specified.

For the purposes of this specification and the appended claims, "organophilic" refers to the characteristic of having a tendency to attract organic compounds. An organophilic molecular sieve may substantially prefer adsorption of organic molecules to polar molecules, such as water. In a preferred embodiment the organophilic molecular sieve according to the invention also preferentially adsorbs a particular type of organic compound over another type of organic compound.

For the purposes of this specification and the appended claims, "hydrophobic" refers to the characteristic of having a tendency to resist water. A hydrophobic molecular sieve may substantially resist attraction or adsorption of water. In a preferred embodiment, the hydrophobic molecular sieve according to the invention does not adsorb more than 2-5% weight in water based on the weight of the molecular sieve, not including water weight due to capillary condensation.

For the purposes of this specification and the appended claims, "acid-resistant" refers to the characteristic of retaining physical and chemical characteristics in the presence of acid. An acid-resistant molecular sieve may substantially retain its adsorption characteristics in an acidic environment. In a preferred embodiment, an acid-resistant molecular sieve according to the present invention retains its crystalline structure, as determined by observation of the X-ray diffraction pattern, in an acidic environment.

For the purposes of this specification and the appended claims, the term "archival article" includes any article which may be desirable to preserve for a short or long period of time. In a preferred aspect, an archival article includes any object of historic, aesthetic, sentimental or scientific significance. More preferably, an archival article is an article generally preserved in a private collection, a museum, a library, a historical society, an archive or an art gallery. For example, an archival article may be a paper, including a document, a map, a paper currency, a stamp, a rare book, an album page, an artist's paper, a custom paper or a mounting board; a photographic image, including a film, a negative; a slide, a videotape, a microfiche, a microfilm or a photograph; a metal, including a coin, an ornament, or jewelry; a textile, including clothing, an artists' canvas, or a furniture covering; a video or sound recording, including a cassette tape, a record, a compact disk (CD), a VHS video tape or other audio or visual media; an electronic component; a mechanical component; a computer data storage medium, including a computer disk; a plant, animal or mineral specimen, including a herbarium, or a fur, bone or tissue sample; or a fossil.

The preservation article of the invention involves a molecular sieve which has the characteristic(s) of being organophilic, hydrophobic, and/or acid-resistant. In a preferred embodiment, the molecular sieve component of the preservation article selectively adsorbs chemical components from the atmosphere of the archival article.

The preservation article may be positioned in a variety of placements relative to the archival article. For example, the preservation article of the invention may be placed in proximity to the archival article, incorporated into a packaging material, container or support which holds an archival article, or incorporated into the archival article itself.

The preservation article may have additional components, such as one as one or more alkaline buffers or deacidifying agents, one or more adsorbents (including other molecular sieves) or a water or water vapor absorbent. In one aspect of the invention, at least part of the preservation article is in the form of loose particles, such as powders, tablets, macrospheres or granules, which may be contained in separate areas or mixed together. Some or all of the particle components may be sprinkled on a surface, which may have an adhesive to hold the particles in the environment of an archival article, or may be contained in a separate area. For example, a mixture of some or all of the particles may be contained in a compartment placed in or integral with a container. The compartment preferably has an opening or is at least partially gas-permeable to allow gases from within the container to pass through and thereby contact the particles in the compartment. Alternatively, some or all of the particles may be contained in a packet or an interchangable pad, which preferably has an opening or is at least partially gas-permeable to allow gases from within the container to pass through and thereby contact the particles. The packet or interchangable pad may be placed in proximity to the archival article, for instance, in the packaging material, container or support which holds the archival article.

In another aspect of the invention, at least part of the preservation article may be coated on a surface. Preferably, such a coating includes at least one molecular sieve and at least one alkaline buffer or deacidifying agent in a solution, such as a slurry or a colloidal solution, which may be applied to a surface and dried. The coating may also contain additional components, such as an adsorbent of activated carbon. The surface receiving the molecular sieve and alkaline buffer solution or deacidifying agent may be, for example, any surface on a packaging material, a container, a support or an archival article.

Alternatively, the preservation article may be a single- or multi-layered material. The preservation article may have one or more layers which preferably are substantially or totally free of impurities, such as sulfur and lignin. The layers preferably include a substrate which supports the molecular sieve which has the characteristic(s) of being organophilic, hydrophobic, and/or acid-resistant, and any additional components, such as one or more alkaline buffers or deacidifying agents and/or one or more adsorbents (including other molecular sieves). The substrate may include at least one fibrous, woven or non-woven material, including paper, canvas, a textile, wood, metal, glass, cellulose, cotton, foam, plastic or combinations of these. For example, a combination of substrate materials may be selected based on the desired appearance, porosity or types of impurities to be blocked, neutralized or adsorbed by the preservation article.

The molecular sieve which has the characteristic(s) of being organophilic, hydrophobic, and/or acid-resistant and the other components may be distributed in the layers of the preservation article in any configuration. For example, a molecular sieve and an alkaline buffer or deacidifying agent may be interspersed in a single layer or a molecular sieve and an alkaline buffer or deacidifying agent may be contained in separate layers, such as two distinct layers of the preservation article.

In a preferred aspect of the invention, the archival article is held in a packaging material, a container or on a support. For example, the packaging material, preferably a paper, foam or cotton material, may be a tissue paper, a cushioning material, a shredded paper, a barrier paper, a lining paper, an interleaving paper, a wrapping paper, an enclosure paper or a tape have an adhesive on at least one side. The container may be of any shape and made of any material which is suitable to hold the archival article. For example, the container may be a display case, a drawer, a shelf, a rare book box, a record or document case, a photographic storage box, a map or print box, a file folder, an album, a scrapbook, a plastic enclosure, an envelope or a protective covering or fastener for a reel of film, such as a button and string tie. The support, for example, may be a mat or mounting board, a corrugated board, a framing or backing board, or an archival containment board. The packaging material, container or support is preferably substantially or totally free of impurities, such as sulfur and lignin.

In a preferred aspect, the preservation article may be an integral portion of the packaging material, container or support which holds the archival article. For example, the archival article may be held in a container which is made of a sturdy boxboard having a layered preservation article in the form of a sheet which lines a surface of the interior of the container. The sheet may have a surface at least partially coated with an adhesive to hold the sheet to a surface of the container. Another example involves an archival article which may be held in a container formed from a sturdy boxboard having a preservation article of loose particles positioned in a compartment which is integral with the container. Alternatively, the archival article may be held on a framed mat or mounting board in which at least one layer of the mat or mounting board incorporates a molecular sieve which has the characteristic(s) of being organophilic, hydrophobic, and/or acid-resistant and, optionally, other preservation article components. The preservation article components, including the molecular sieve which has the characteristic(s) of being organophilic, hydrophobic, and/or acid-resistant and, optionally, one or more alkaline buffers or deacidifying agents and/or one or more adsorbents may also be applied as a coating to the surface of a packaging material, container or support and dried.

In another aspect of the invention, the preservation article is incorporated in the archival article. For example, an archival article in the form of a paper may incorporate a layered preservation article. In a preferred embodiment of the invention, a paper, such as artist's paper or canvas having a surface suitable for drawing or painting, may incorporate a layered preservation article within the paper or on a side of the paper, preferably the side opposite the drawing or painting surface. The paper may additionally contain a vapor barrier, such as a plastic or polymer layer, e.g., polyester or metallized polyester, which may substantially or totally prevent harmful gases from affecting the matted and framed work of art. The preservation article components, including the molecular sieve which has the characteristic(s) of being organophilic, hydrophobic, and/or acid-resistant and, optionally, one or more alkaline buffers or deacidifying agents and/or one or more adsorbents may also be applied as a coating to the surface of an archival article and dried.

The following preferred aspects and embodiments of the invention apply to all of these variations for placement of the preservation article relative to the archival article.

In a preferred aspect of the invention, one or more alkaline buffers or deacidifying agents and/or one or more adsorbents may be used in the preservation article in addition to one or more molecular sieves which have the characteristic(s) of being organophilic, hydrophobic, and/or acid-resistant. For example, in a preservation article which is layered, a combination of two or more molecular sieves having the characteristic(s) of being organophilic, hydrophobic, and/or acid-resistant may be used in the same layer, and different layers of the preservation article may contain different molecular sieves which have the characteristic(s) of being organophilic, hydrophobic, and/or acid-resistant. A combination of two or more alkaline buffers or deacidifying agents may be used in the same layer, and different layers of the preservation article may contain different alkaline buffers or deacidifying agents. Also, a combination of two or more adsorbents (including other molecular sieves) may be used in the same layer, and different layers of the preservation article may contain different adsorbents. Some layers of the preservation article may contain no molecular sieve which has the characteristic(s) of being organophilic, hydrophobic, and/or acid-resistant, no alkaline buffer or deacidifying agent and/or no adsorbent.

In another preferred aspect, the preservation article may contain multiple layers and one or more of the layers has a different density than the density of the other layer or layers. Preferably, one or more layers has a substantially different density than the density of another layer such that the porosity, strength or flexibility of the layers is appreciably different. The use of multiple densities may advantageously improve the durability and preservation characteristics of the preservation article. For example, in many containers, such as file folders and boxes, it is preferable to use sturdy materials which can withstand repeated handling. However, some layers of the preservation article may exhibit better performance when they have a greater porosity and lower density.

The densities of the preservation article layers may vary depending on factors such as the desired structural strength, weight, flexibility and adsorbancy of the preservation article. For example, a file folder incorporating a multi-layer preservation article may have layer densities preferably from 1.5 g/cc to 0.3 g/cc. In a file folder having a high density layer and a low density layer, the high density may preferably range from 0.8 g/cc to 1.5 g/cc and more preferably about 0.9 g/cc to 1.1 g/cc. The low density may preferably range from 0.3 g/cc to 0.7 g/cc, and more preferably about 0.5 g/cc to 0.6 g/cc. The thickness of the layers is preferably to 0.001" to 0.02", and more preferably 0.005" to 0.01". In other applications, the density and thickness may vary greatly, depending on the materials in the layers. For example, a layer having a substrate of corrugated cardboard may have a much greater thickness than those listed above.

The present invention features a preservation article component of a molecular sieve which has the characteristic(s) of being organophilic, hydrophobic, and/or acid-resistant. In addition to the molecular sieve which has the characteristic(s) of being organophilic, hydrophobic, and/or acid-resistant, a variety of other adsorbents may be used in the invention. The adsorbents to be used in the invention include all known adsorbents which are compatible with the archival articles which are to be preserved. The adsorbents may adsorb, absorb or react and decompose a variety of impurities which are in the environment of the archival article.

The impurities may be present due to impurities penetrating the container holding the archival article, impurities originally in the container material, impurities originally in the atmosphere of the closed container, impurities from the archival articles or by-products from impurities in the environment of the archival article. For example, impurities may be emitted from various sources such as interior building components including wood and oil based paints, air pollution or other archival artifacts, such as concentrations of pyrite trapped in fossils and concentrations of polyvinylchlorides in cassette tapes. Other potential impurities may include, for example, oxidizing agents, hydrogen sulfide ($H_2S$), hydrogen peroxide ($H_2O_2$), sulfuric acid ($H_2SO_4$), ozone ($O_3$), formaldehyde, nitrogen oxides ($NO_x$), chlorine ($Cl_2$), and sulfur dioxide ($SO_2$), ketones, aldehydes, phenols, and their associated acids.

The adsorbent used in the preservation article may be a molecular sieve, an activated carbon (including modified activated carbon), activated charcoal, or similar carbon-containing adsorbent materials, silica, silicate gel, activated alumina or combinations of these. In some cases, the preservation article involves an adsorbent which also acts as an alkaline buffer or deacidifying agent or may be treated to act as an alkaline buffer or deacidifying agent.

Molecular sieves are microporous structures, such as crystalline aluminosilicates, belonging to a class of materials known as zeolites, or crystalline aluminophosphates derived from mixtures containing an organic amine or quaternary ammonium salt. The terms "molecular sieve" and "zeolite" are used interchangably throughout the technical literature. Nevertheless, "molecular sieve" may be defined as a class of microporous structures composed of either crystalline alumino silicates (zeolites) or crystalline aluminophosphates, while "zeolites" are a class of hydrated silicates of aluminum. *Hawley's Condensed Chemical Dictionary*, 11th ed. (1987) pp. 792–93 and 1248–49. Molecular sieves are known for their selective molecular separations based on size and polar properties. Molecular sieves generally act as adsorbents for those molecules that are small enough to pass through the pores of the crystals to enter the cavities and be adsorbed on the interior surface, although they may also be involved in chemical bonding and absorption. Molecular sieves such as the mesoporous materials referred to by Beck et al., *American Chemical Society*, Dec. 30, 1992, may provide up to about 700 or more square meters of surface area per gram. The used molecular sieves may also be regenerated, for example, by vacuum or a nitrogen sweep.

Zeolites may have an aesthetic advantage over other adsorbents, such as activated carbon, in some layers of the preservation article. Activated carbon generally will cause the preservation article to have a gray appearance and may leave a pencil-like mark on an archival article that it contacts. The zeolites are generally white and do not leave marks on the archival articles they contact.

Zeolites are commercially available, such as Purmol 3A (a synthetic sodium aluminosilicate, pore size approximately 3 angstroms), Purmol 4A (a synthetic sodium aluminosilicate, pore size approximately 4 angstroms), Purmol 5A (a synthetic calcium sodium aluminosilicate, pore size approximately 5 angstroms) and Purmol 13x (a synthetic sodium aluminum silicate, pore size approximately 10 angstroms), produced by Zeochem. The zeolites may be pretreated, for example, by dehydration, ion exchange, or impregnation with compounds such as oxidants, including potassium permanganate, prior to incorporation into the preservation article.

The molecular sieve which has the characteristic(s) of being organophilic, hydrophobic, and/or acid-resistant is also commercially available, such as Purmol 5A-1 and Purmol 5A-2, both which are expected to be acid-resistant and hydrophobic and are produced by Zeochem; MHSZ-173 and MHSZ-420, which are expected to be hydrophobic and acid resistant and is produced by UOP Co.; and AW 300 and AW 500 which are expected to be acid-resistant and is produced by UOP, Co. The characteristic(s) of being organophilic, hydrophobic, and/or acid-resistant may be due to the composition and structure of the molecular sieve. For example, the order and disorder of silicon and aluminum ions in the molecular sieve framework may produce different symmetry and crystal systems. The characteristics of the molecular sieve may also vary due to compositional variations in the (Si,Al)-O framework and the presence or absence of exchangeable cations.

Activated carbon may be defined as carbon (charcoal) treated at high temperature with steam, air or carbon dioxide which gives the carbon a porous internal structure and imparts improved adsorbent qualities. The activated carbon may also be modified with other materials, such as copper, chromium, or a caustic such as sodium hydroxide. The used activated carbon may be regenerated. Activated carbons are commercially available, such as PCB-G Pulverized, WPA, BL, FCA (treated with Cu and Cr), and Sel Fu Sorb (treated with Cu), produced by Calgon Carbon Corporation.

For the purposes of the invention, the terms "alkaline buffer" or "deacidifying agent" includes all compounds which are capable of reducing or eliminating the effect of acidic components in an environment. The alkaline buffer or deacidifying agent to be used in the invention includes all known materials which are compatible with the articles which are to be preserved. The alkaline buffer or deacidifying agent may neutralize acids and other impurities which are in the environment of the archival article. The acids may be present due to acidic materials penetrating the container holding the archival article, acidic materials originally in the container material, acidic materials originally in the atmosphere of the closed container, acidic materials from the archival articles themselves, or acidic by-products from impurities in the environment of the archival article.

In a preferred aspect, the alkaline buffer or deacidifying agent in the preservation article is an alkaline earth carbonate or bicarbonate, such as calcium carbonate, magnesium carbonate or magnesium bicarbonate. Zinc oxide or zinc carbonate may also be a suitable alkaline buffer or deacidifying agent. One or more alkaline buffers or deacidifying agents may be used in a preservation article, for example, a combination of calcium carbonate, magnesium carbonate and zinc oxide.

In a preferred aspect, the alkaline buffer, deacidifying agent or combination of buffers and deacidifying agents and the adsorbent or combination of adsorbents, and the amount of alkaline buffer or deacidifying agent and adsorbent to be used in the preservative article are selected based on the type of impurities expected to be present in the environment of the archival article. For example FCA (treated with Cu and Cr) may adsorb or react with sulfides or peroxides; Sel Fu Sorb (treated with Cu) may adsorb or react with peroxide and sulfides; Purmol 4A and Purmol 5A may adsorb or react with peroxides, sulfides, sulfur dioxide and nitrogen oxides; and zinc oxide may adsorb or react with sulfides. Activated carbon may adsorb or react with low molecular weight materials, such as acetic acid and formic acid. Preferably, activated carbon may adsorb compounds having molecular weights of 60 or more. Activated carbon may adsorb or react with chlorine, ozone, peroxides, and possibly formaldehyde.

Two or more adsorbents may be combined within the same preservation article or even the same layer, particularly if the different adsorbents are selected to remove different impurities from the environment of the archival article. For example, zeolites of different pore sizes or combinations of zeolite(s) and activated carbon(s) may be mixed together in order to capture or react with molecules of varying sizes.

Some environments may also be unsuitable for particular adsorbents. For example, adsorbents which adsorb water vapor may not be suitable in environments with excessive water vapor. The water vapor may be adsorbed by the adsorbents such that the capacity of the adsorbent to adsorb further impurities is significantly reduced. Preferably, undesirable water vapor in the environment of the archival article is removed or controlled. For example, a water vapor absorbent, such as a silica gel, may be provided in the environment of the archival article or incorporated in the preservation article.

The combination of an alkaline buffer or deacidifying agent and an adsorbent, including the molecular sieve which has the characteristic(s) of being organophilic, hydrophobic, and/or acid-resistant, may also exhibit a synergistic effect. For example, the adsorbent may capture various impurities and prevent them from contacting and damaging the archival article. However, the captured impurity may react with another compound and release a product which may contact and damage the archival article. For example, sulfur dioxide ($S_2O$) which is trapped in an adsorbent may react with moisture and oxygen to produce sulfuric acid ($H_2SO_4$) which may contact and damage the archival article. However, in the invention, the alkaline buffer or deacidifying agent will neutralize acidic compounds, including sulfuric acid ($H_2SO_4$). Therefore, the combined action of the alkaline buffer or deacidifying agent and the adsorbent may have a synergistic effect.

In a preferred aspect, the preservation article may contain other components or layers which provide additional desired characteristics to the preservation article. For example, the preservation article may have a component or layer which provides support, protection, flame resistance, a vapor barrier or an indicator. The preservation article may contain one or more supporting layers which may include a fibrous, woven or non-woven material, including paper, canvas, a textile, wood, metal, glass, cellulose, cotton, foam, plastic or combinations of these. The supporting layer may provide additional strength and durability to the preservation article.

The preservation material may include a protective layer or coating which is positioned between the article to be preserved and the other layers of the preservation article. For example, if the preservation article is in the form of a sheet which covers an interior surface of a container, the protective layer may be the outermost surface in the interior of the box which is positioned between the archival article and the other layers of the preservation article. The protective layer or coating is particularly useful to preserve archival articles which are sensitive to alkaline conditions, such as photographs, silk, wool or cyanotype materials. A protective layer or coating may also be useful to prevent the preservation article from leaving discolorations, such as carbon marks, on the archival article. The protective layer or coating may be a neutral pH, nonbuffered layer which may be adjacent to or in contact with the article to be preserved. The protective layer or coating may also be a buffered layer, optionally containing zeolites, which generally do not leave marks on archival articles.

In another preferred aspect, the preservation article may contain a flame resistant component or layer. The flame resistant characteristic is preferably provided by a metal foil, a fire retardant salt or a fire resistant composition, such as Nomex (produced by Dupont) or a combination of Nomex and mica.

The preservation article may contain a vapor barrier layer or coating to prevent moisture and other undesirable compounds from passing through the preservation article and contacting the archival article. In a preferred embodiment, a multi-layer preservation article incorporates a vapor barrier layer or coating of any material which prevents vapor from passing through the layered preservation article. For example, the vapor barrier layer or coating may be composed of a metal, a plastic, a polymer, or a combination thereof, such as polyester, polypropylene, metallized polypropylene or metallized polyester. The vapor barrier layer may also be a sheet or coating of Marvelseal™ (commercially available from Ludlow Corp.).

Another preferred aspect of the invention is a preservation article having an indicator component or layer. An indicator component or layer may signal a change in the atmosphere of the archival article or the condition of the preservation article. For example, the indicator component or layer may change color upon a condition such as a pH level, a temperature level an impurity content or a moisture content. In a further preferred aspect, a preservation article according to the invention contains an indicator which changes color upon the presence of an undesirable level of moisture. For example, a silica gel may be available which changes color when it has adsorbed a certain amount of moisture.

In another aspect of the invention, the use of the preservation article of the invention may advantageously avoid the use of non-biodegradable materials, such as a metal, a foil or a plastic, e.g., polyester or polyethylene, in packaging materials. For example, polyester and polyethylene are used for packaging products, such as electronic components and photographic films, to prevent atmospheric pollutants from contacting and damaging them. However, polyester and polyethylene do not generally degrade quickly in landfills, and thus pose a disposal problem. A preservation article according to the invention may effectively protect archival articles without using such materials.

The amount of alkaline buffer or deacidifying agent and adsorbent in the preservation article may vary, depending on factors such as the size and configuration of the archival article and the preservation article, the sensitivity of the archival article to the components of the preservation article, the impurities expected to be in the environment of the archival article and the length of time for preservation. The preservation article may contain any desired amount of the molecular sieve which has the characteristic(s) of being organophilic, hydrophobic, and/or acid-resistant and, preferably, contains at least 1% by weight of the preservation article.

In a preferred embodiment, a layer of a preservation article may preferably contain an amount of alkaline buffer or deacidifying agent or buffers which ranges from about 1 to about 20%, and more preferably from about 2 to about 5%, and most preferably from about 3 to about 5% by weight based on the total weight of the layer in which the alkaline buffer, deacidifying agent or buffers are contained. In a further preferred embodiment, the preservation article or a layer of the preservation article may preferably contain an amount of adsorbent or adsorbents which ranges from about 1 to about 50%, and more preferably from about 5 to about 30% by weight based on the total weight of the preservation article or layer in which the adsorbent or adsorbents are contained.

Another aspect of the invention involves a container with a removable divider plate, which preferably functions as a support plate, for selectively determining a dimension of the available storage space to prevent the archival articles, such as documents, in the container from curling or bowing when the container is less than full of documents. The container preferably includes a box-shaped receptacle having a bottom, a front wall, a back wall, and an opposing pair of side walls. An opposing pair of internal walls are positioned within the box-shaped receptacle generally parallel to and spaced from the pair of side walls, and at least one opposing pair of substantially-vertical slots are formed within the pair of internal walls. The container further includes at least one divider plate having an opposing pair of tabs extending substantially perpendicularly from its opposing ends, wherein each tab is adapted to be received by a corresponding slot and positioned substantially parallel to and between a corresponding internal wall and side wall.

Preferably, the box-shaped receptacle and opposing pair of internal walls are integrally formed from a single sheet blank of a material which will not harm the archival documents to be stored inside. It is also preferred that the container includes a cover hingedly attached to the back wall to substantially seal the archival documents stored therein.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of the specification, illustrate the invention and, together with the written description, serve to explain the principles of the invention.

FIG. 4 is a plan view of a representative embodiment of a single sheet blank for assembling the container of FIG. 3;

FIG. 6 is a side elevation of a sheet of artist's paper containing a buffer and an adsorbent.

FIG. 7 is various side views 7A–7F of layered preservation articles.

DETAILED DESCRIPTION OF THE DRAWINGS

Figure 1:
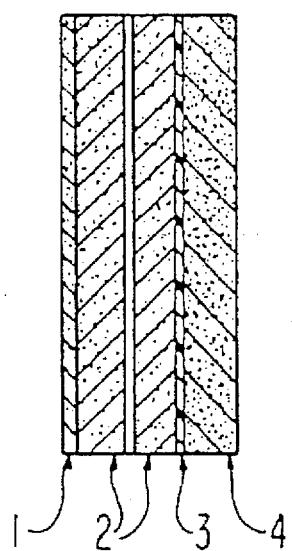
FIG. 1 is a side elevation of a layered material with a buffered inner layer and a vapor barrier.

In accordance with an aspect of the invention, FIG. 1 illustrates a layered material. As here embodied, in FIG. 1, layers 1 and 2 are porous paper formed on a paper processing machine, such as a cylinder paper machine or an inclined fourdrinier machine. Layer 1 is the outermost layer deposited by the machine cylinder. It forms the inside of an archival box. Layer 1 can contain alkaline buffering or could be a neutral pH, nonbuffered layer. It can optionally contain an adsorbent, such as activated charcoal. Preferably, it is highly porous and is made from fibers such as eucalyptus or other fibers having like properties. Layer 2 is deposited on the paper layer by other cylinders and may contain an adsorbent or combination of adsorbents, such as activated carbon(s) and/or zeolite(s) and a buffer, such as calcium carbonate. Layers 1 and 2 form a continuous sheet of paper, and are not separated by an adhesive as they would be in a laminated sheet.

Layer 3 is a barrier layer formed from metallized polyester. It will prevent the passage of vapor through the final product. It is laminated to layers 2 and 4. Layer 4 forms the exterior of a container. It is made from a strong, high density paper having good durability and archival characteristics. It is preferably made in a non-acidic paper system and has an alkaline pH. It contains an alkaline buffering material, such as calcium carbonate, and uses a neutral or alkaline (i.e., non-acidic) sizing.

The layered material of FIG. 1 can be formed in varying thicknesses, densities and paper fiber compositions. It can be incorporated into archival articles and packaging materials, container and supports, such as art paper, file folders, envelopes, mats, mounting boards or as a container for storing papers which are to be preserved in their original state for an extended period of time.

Figure 2:
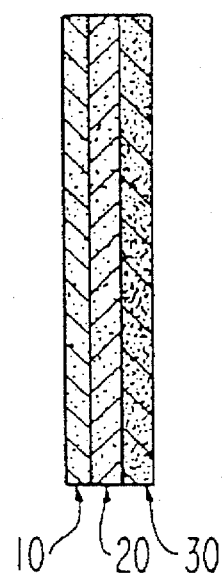
FIG. 2 is a side elevation of layered material containing a buffer and an adsorbent.

In accordance with an aspect of the invention, FIG. 2 represents a non-laminated multilayer paper which can be used for interior housings such as envelopes, file folders, interleaving papers, album pages, artist papers, mats, mounting boards and papers, permanent records or other objects where the preservation of the paper in its original state is desired.

In FIG. 2, layer 10 is the interior surface and can be the interior of an envelope, box or file folder. Layer 10 could also be the surface of an artist's paper which would accept the medium in use such as water color, ink, paint or chalk. In that case, FIG. 2 represents a side elevation of an artist's paper. Layer 10 is preferably made in a nonacid papermaking system and preferably is free of or substantially free of lignin and sulfur. It preferably has a pH in the neutral to alkaline range and contains an alkaline buffer such as calcium carbonate. In some circumstances, it may be desirable for this layer to have a neutral pH and not contain alkaline buffers. Such circumstances would include cases where a protein-based material is to be stored in or maintained next to this layer. In other circumstances, it may be desirable to include both an adsorbent or combination of adsorbents, such as activated carbon(s) and/or zeolite(s), and an alkaline buffer such as calcium carbonate in layer 10. Layer 10 preferably has a high porosity, so that harmful substances can easily pass into and be absorbed by this layer.

Layer 20 is a non-laminated layer. This layer contains an adsorbent or combination of adsorbents, such as activated carbon(s) and/or zeolite(s), and an alkaline buffer, such as calcium carbonate. It is preferably made in a non-acidic papermaking system and is preferably free of or substantially free of lignin and sulfur. It preferably has a pH which ranges from neutral to alkaline.

Layer 30 is an exterior layer of the material. It could form the exterior layer in a housing such as an envelope, box or file folder, or the back of a sheet of paper. If this laminated material were to be used as an artist's paper, layer 30 would represent the side on which the artist would not draw or paint. Layer 30 can contain an adsorbent or combination of adsorbents, such as activated carbon(s) and/or zeolite(s), and an alkaline buffer such as calcium carbonate. It may also contain alkaline buffer alone. It is preferably made in a non-acidic papermaking system and is preferably free from or substantially free from lignin, sulfur and similar undesirable materials. Layer 30 preferably has a pH in the neutral to alkaline range. If layer 30 is to form the exterior of a housing such as an envelope, box or folder, it preferably has a high density and good durability and surface strength. If this layer is to be colored, non-bleeding permanent colors should be used.

The multilayered structures of FIGS. 1 and 2, as well as other structures within the scope of the invention, can be made by processes which are substantially similar to those disclosed in U.S. Pat. No. 4,489,120, the disclosure of which is totally incorporated herein by reference. The adsorbent and the buffer can be added to the inner layers of the structure by mixing appropriate amounts of them with the slurry from which the inner layers are to be formed.

In a preferred method, webs are formed by blending fibers that are cut and fibrillated. Fibrillation develops fibrils which can mechanically entrap fillers, pigments, surface active materials, buffers and/or adsorbents. The retention produced by this mechanism can be from about 50% to about 60%. When the fiber mat is formed, entanglement of fibers of varying lengths can increase retention to from about 70% to about 80% by fibrillation.

The total retention can be chemically increased to from about 90% to about 98%. Certain chemical combinations such as latex and charged water soluble polymers can produce co-precipitation and agglomeration of polymer surface active fillers and cellulose fibrils. Another possible mechanism involves the electrokinetic attachment of charged water soluble polymers to cellulose fibers. The surface active fillers then attach to the charged polymers. Yet another possible mechanism involves the addition of polymers to form a protective colloid with polymers being attached to the surface active filler. The protective colloid can then attach to fiber surfaces. The surface activity of the protective colloid is not significantly diminished; thus, the surface active fillers or pigment can maintain a high level of activity for absorption of gases of acidic materials that cause deterioration. The polymer combinations may also result in a binding of the surface active filler or pigment, such as activated charcoal and alkaline buffers like calcium carbonate, into the finished, dried fibrous web. The physical and chemical retention mechanisms are usually synergistic, resulting in high retention levels of over about 95%. The remaining percentage is lost in the white water of the paper machine.

Each of the layers described herein (other than the vapor barrier) is preferably made from alpha cellulose or pulp, which is preferably fully bleached. The layers are preferably free of lignin, ground wood, waxes, plasticizers, reducible sulphur, oxidizing chemicals and potentially harmful non-cellulose products. The sulfur content is preferably less than about 0.0008% reducible sulfur as per ASTMD 984-74 or Tappi 406, su 72. The layers are preferably non-tarnishing as per accelerated tarnishing test ASTMD 2043-69 and Tappi T 444, T 564. The layers are preferably free of particles of metal. Alkaline sizing is preferably used. The surface of the layers is preferably smooth and free from knots, shives and abrasive particles. If it is desired to produce a less expensive product, the layers can contain lignin. They can also be made from recycled paper.

The container preferably shows a maximum fiber loss of one-tenth of one percent after 100 cycles according to Tappi 476. The smoothness is preferably a minimum of 195 Sheffield units following Tappi UM-518 test. The outer portion of the container will preferably withstand a minimum of about 1,000 double folds in the weakest direction at 1 kg load after conditioning according to Tappi 511. The outer portion of the container preferably has a minimum Elmendorf internal tear resistance of about 350 gr. per sheet after conditioning according to Tappi T 414. The outer portion of the container preferably has about 2800 stiffness units in the machine direction and 1400 stiffness units in the cross direction according to Tappi 489. The bursting strength of the outer portion of the container is preferably at least about 300 psi when tested in accordance with Tappi T 807.

When measured according to Tappi T-460-os-68 (the Gurley porosity test), the inner layers preferably will have a Gurley porosity figure of less than about 100 sec/100 cc of air, and more preferably of from about 5 sec/100 cc and about 70 sec/100 cc. The outer layer preferably has a Gurley porosity of from about 200 sec/100 cc and about 1000 sec/100 cc. The vapor barrier is, of course, not porous, since it is used to prevent pollutants such as $NO_x$, $S_2O$, ozone, peroxides and similar harmful compounds from entering the container.

Figure 5:
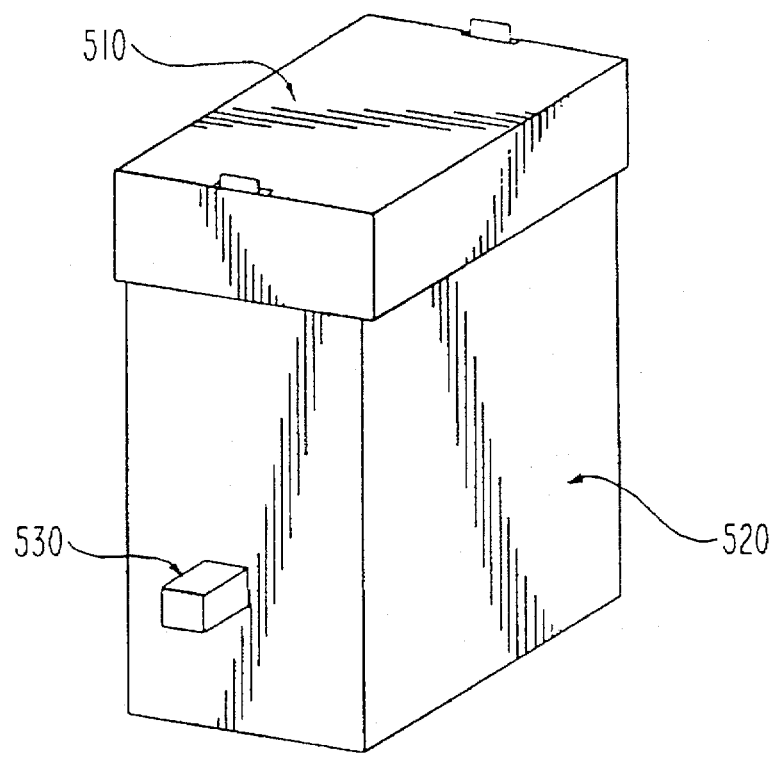
FIG. 5 is an orthographic view of a representative embodiment of a container having a buffer and/or adsorbent contained therein constructed of the material of FIGS. 1 or 2.

In accordance with another aspect of the invention, FIG. 5 is an orthographic view of a representative embodiment of a container having a buffer and/or adsorbent contained therein. The container preferably has a top 510, a body 520 and may contain a solid object 530 comprising the buffer and/or adsorbent. The buffer and/or adsorbent can in addition or instead be an integral part of the top 510 and/or body 520.

In accordance with another aspect of the invention, FIG. 6 represents a sectional view of an artist's paper. Layer 610 represents the surface of an artist's paper which would accept the medium in use such as water color, ink, paint or chalk.

Layer 620 is a non-laminated layer. This layer contains an adsorbent such as activated carbon and an alkaline buffer such as calcium carbonate. It is preferably made in a non-acidic papermaking system and is preferably free of or substantially free of lignin and sulfur. It preferably has a pH which ranges from neutral to alkaline.

Layer 630 is an exterior layer of the material, and could also represent a side on which the artist would draw or paint, if a two sided artist's paper was desired. Layer 630 can contain an adsorbent such as activated carbon and an alkaline buffer such as calcium carbonate. It may also contain alkaline buffer alone. It is preferably made in a non-acidic papermaking system and is preferably free from or substantially free from lignin, sulfur and similar undesirable materials. Layer 630 preferably has a pH in the neutral to alkaline range. If this layer is to be colored, non-bleeding permanent colors should be used.

In a preferred embodiment, there is a layered material for the preservation of archival documents and objects which comprises a buffered second layer, a buffered first layer and a vapor barrier positioned between the first layer and the second layer.

Preferably, the first and/or second layers are buffered with calcium carbonate, magnesium carbonate, magnesium bicarbonate, zinc oxide, zinc carbonate or a mixture thereof. Preferably, the vapor barrier comprises a layer of polyester, and the polyester is preferably metallized. Preferably, the first layer further comprises an adsorbent such as activated carbon.

Preferably, the first layer comprises at least about 10% by weight of the adsorbent based on the total weight of the first layer. More preferably, the layer contains at least about 20% by weight of the adsorbent. Preferably, the first layer comprises an amount of a buffering agent which ranges from about 2 to about 5% by weight based on the total weight of the first layer. More preferably, the amount of buffering agent ranges from about 3 to about 4% by weight.

Preferably, the second layer has a smooth and durable finish, and may comprise fibers of northern softwoods. The material can further comprise a porous layer, wherein the first layer is positioned between the porous layer and the vapor barrier. Preferably, the porous layer is substantially free of the adsorbent, in order to avoid contact between, e.g., activated carbon and the archival documents or objects stored therein. Preferably, the porous layer contains a buffer and comprises a high quality fiber such as cotton, northern softwood or eucalyptus fibers. The porous layer is preferably free from lignin and sulfur. The porous layer can also comprise an adsorbent such as activated carbon. Both the first and second layer preferably have a neutral to alkaline pH, preferably ranging from about 8.5 to about 9.5.

In accordance with another aspect of the invention, the container can be configured to permit the long term storage of archival documents without slippage of the archival documents or the resulting deformation.

Figure 3:
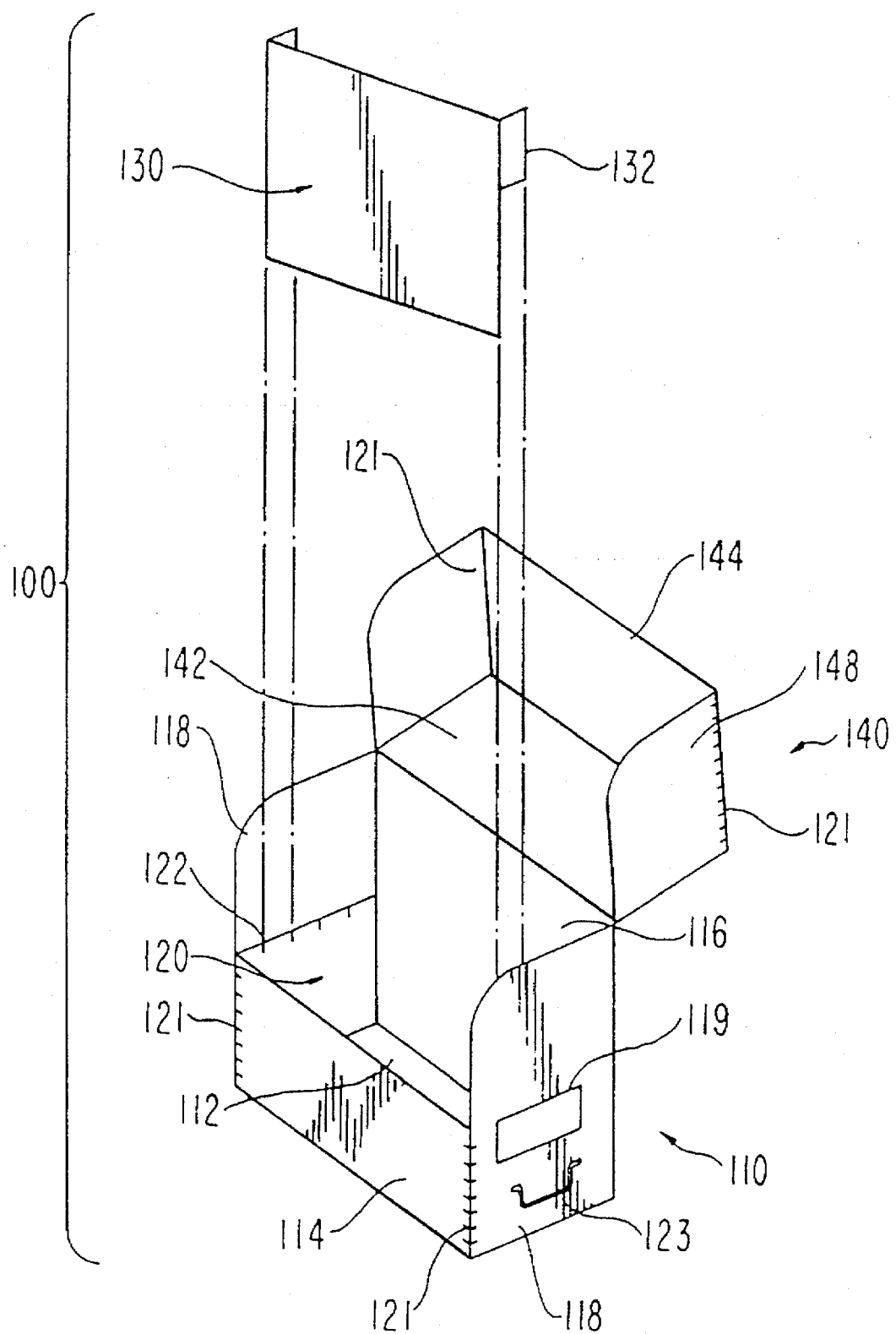
FIG. 3 is an exploded orthographic view of a representative embodiment of a container and removable divider plate constructed of the material of FIGS. 1 or 2.

The container is preferably made from archival article, includes a box-shaped receptacle having a removable divider plate for selectively determining a dimension of the available storage space. More specifically, and as best seen in FIGS. 3 and 4, the container 100 may include a box-shaped receptacle 110 having a bottom 112, a front wall 114, a back wall 116, and an opposing pair of side walls 118. An opposing pair of internal walls 120 can be positioned within the box-shaped receptacle 110 generally parallel to and spaced from the pair of side walls 118. As seen in FIG. 3, at least one opposing pair of substantially-vertical slots 122 can be formed within the pair of internal walls 120.

The container may further include at least one divider plate 130 having an opposing pair of tabs 132 extending substantially perpendicularly from plate 130. Each tab 132 can be adapted to be received by a corresponding slot 122 and positioned substantially parallel to and between a corresponding internal wall 120 and side wall 118, as best seen in FIG. 3. The tabs 132 can face either the front or the back of the container, depending on which side of the container will be more heavily loaded. More specifically, the divider plate 130 is adapted such that the opposing pair of tabs may be slid substantially vertically into engagement with the slots 122 formed in the opposing pair of internal walls 120. As such, it should be evident that by providing a plurality of pairs of slots, selective adjustment of a dimension of available storage space within the container can be greatly enhanced to prevent the documents in the container from curling or bowing when the container is less than full of documents. Further, it is preferable to form the slots 124 with V-shaped entries 124 to facilitate easier insertion of the divider plate 130 within the slots 124.

In the preferred embodiment of the container, the box-shaped receptacle 110 and opposing pair of internal walls 120 are integrally formed from a single sheet blank 101 of the material of the invention set forth above. FIG. 4 presents a representative embodiment of such a single sheet blank 101. As seen in FIG. 4, the single sheet blank is divided by a series of living hinges 105 to form the bottom portion 112, the bottom tabs 113, front wall portion 114, the back wall portion 116, the side wall portion 118, and the internal wall portions 120.

To assemble the container 100, the bottom tab portions 113 are first folded perpendicular to the side wall portions 118, and the internal wall portions 120 are folded perpendicular to the front wall portion 114. The side wall portions 118 are then folded perpendicular to the back wall portion 116, and both the front wall portion 114 and the back wall portion 116 are then folded perpendicular to the bottom portion 112 and substantially parallel with each other. As such, the forward edges of the side wall portions 118 may then be attached to the outer edges of the front wall portion 114, with the internal wall portions 120 extending within the box-shaped receptacle generally parallel to and spaced from the pair of side walls portions 118. Conventional strip staples 121 or other fasteners may be used to attach the walls along their edges. A conventional label opening 119 and a wire handle 123 may also be added. Modifications may be made to the single sheet blank to vary the shape of the box-shaped receptacle, as desired, into other sizes or shapes such as trapezoidal portions for a pyramidal shape.

Similarly, the divider plate 130 and opposing pair of tabs are also preferably formed from the single sheet blank. As seen in FIG. 4, the divider plate may be formed in a variety of shapes, such as a wider divider plate 130 for greater stability or a thinner divider plate 130' for reduced material costs.

As seen in FIG. 3, the container embodied herein also includes a cover 140 which may be hingedly attached to the back wall 116 of the box-shaped receptacle for substantially sealing the archival documents stored therein. FIG. 4 shows that the cover may likewise be integrally formed from the single sheet blank 101 of material described above. The cover 140 includes a cover top portion 142, a cover front wall portion 144, and cover side wall portions 148. As with the box-shaped receptacle 110, the cover 140 is assembled simply by folding the portions along the living hinges 105 and securing the front edges of the cover side wall portions 148 to the outer edges of the cover front wall portion 144.

Preferably, the receptacle 110, the divider plate 130, or both the receptacle 110 and the divider plate 130 comprise a buffer, an adsorbent or a combination thereof. The receptacle 110, the divider plate 130, or both the receptacle 110 and the divider plate 130 may be formed from the article or layered material described above.

FIG. 7 shows further configurations 7A–7F for a layered preservation article. In each article, 701 is a pH neutral, non-buffered layer; 702 is an layer having activated carbon with alkaline buffers; 703 is a layer having zeolites with alkaline buffers; and 704 is a layer having an alkaline pH with alkaline buffers.

Figure 8:
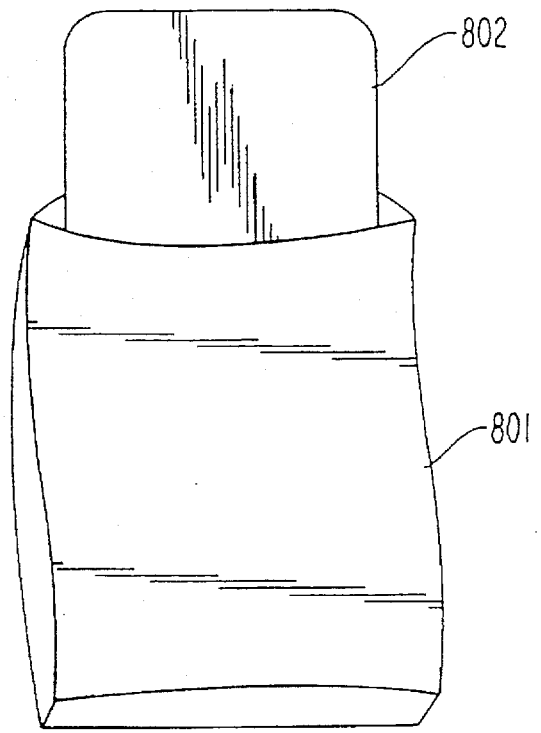
FIG. 8 is an envelope for holding an archival article, such as a photographic negative.
Figure 9:
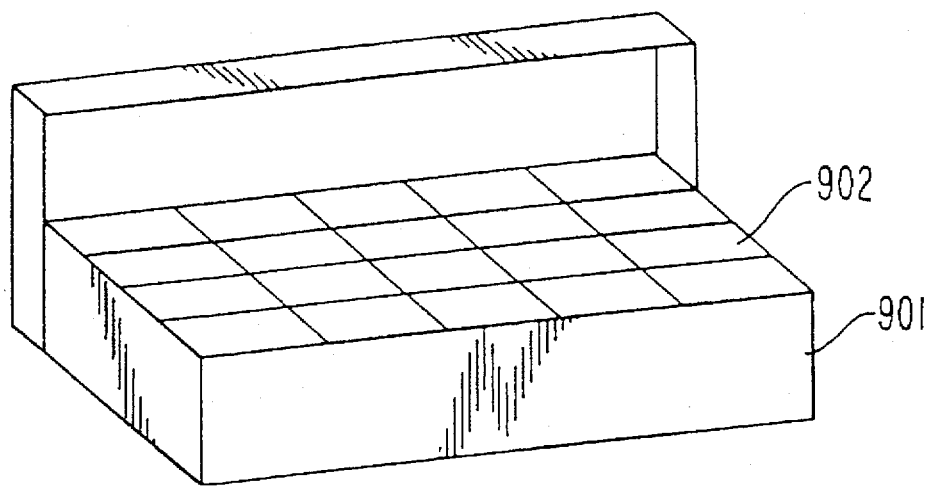
FIG. 9 is a box for holding individual containers which may include photographic slides, specimens or artifacts.
Figure 10:
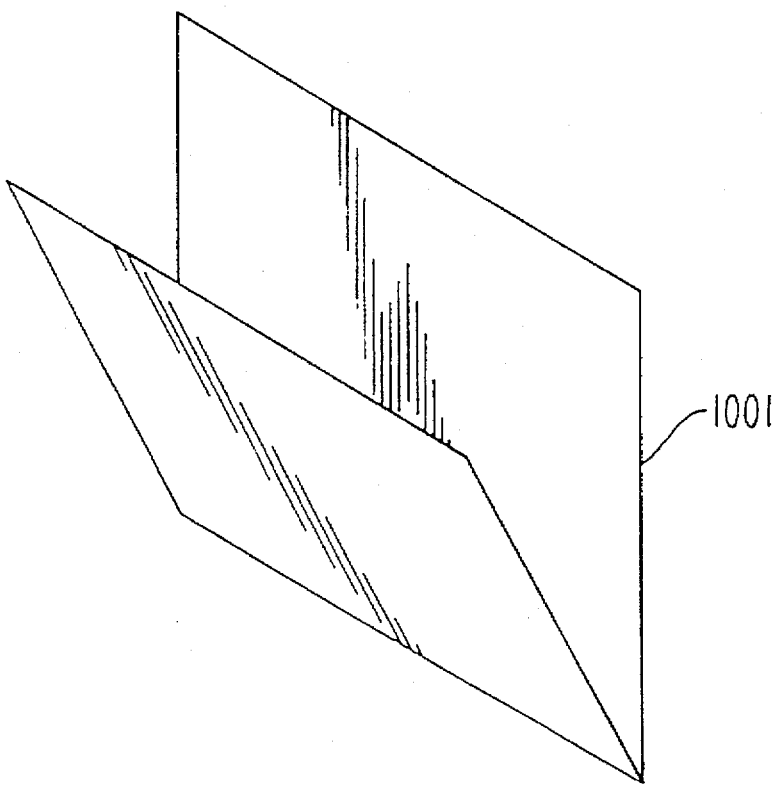
FIG. 10 is a file folder.
Figure 11:
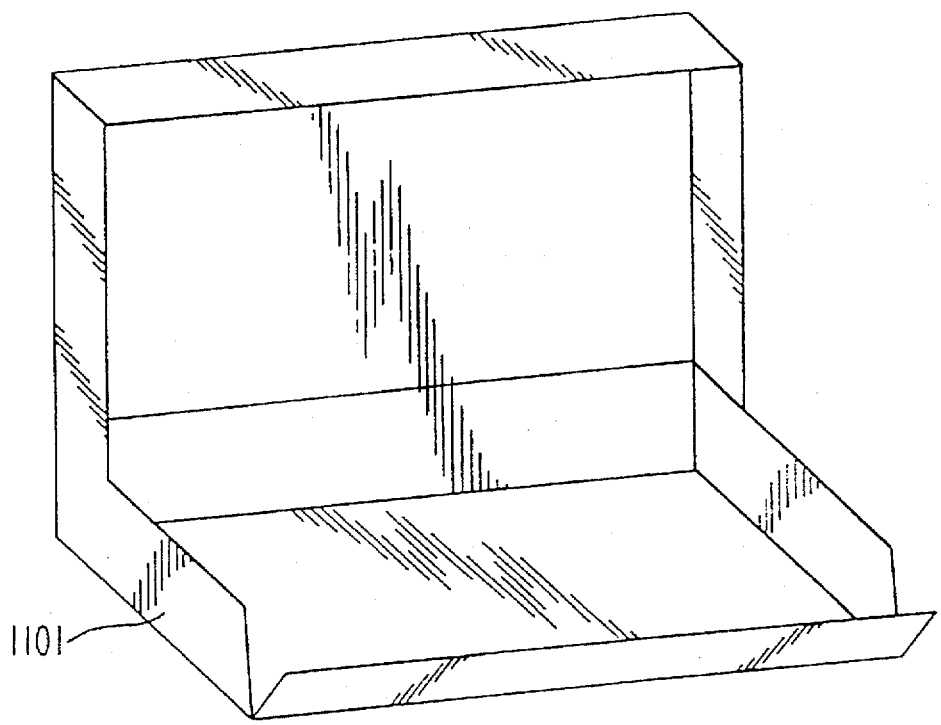
FIG. 11 is a box for storing or transporting.
Figure 12:
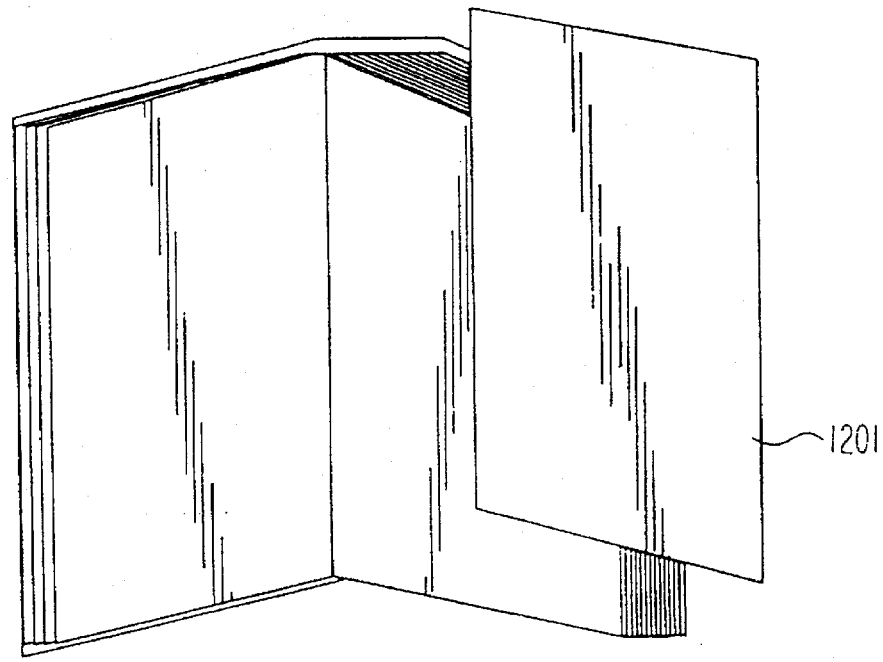
FIG. 12 is an interleaving paper inserted between the pages of a book.
Figure 13:
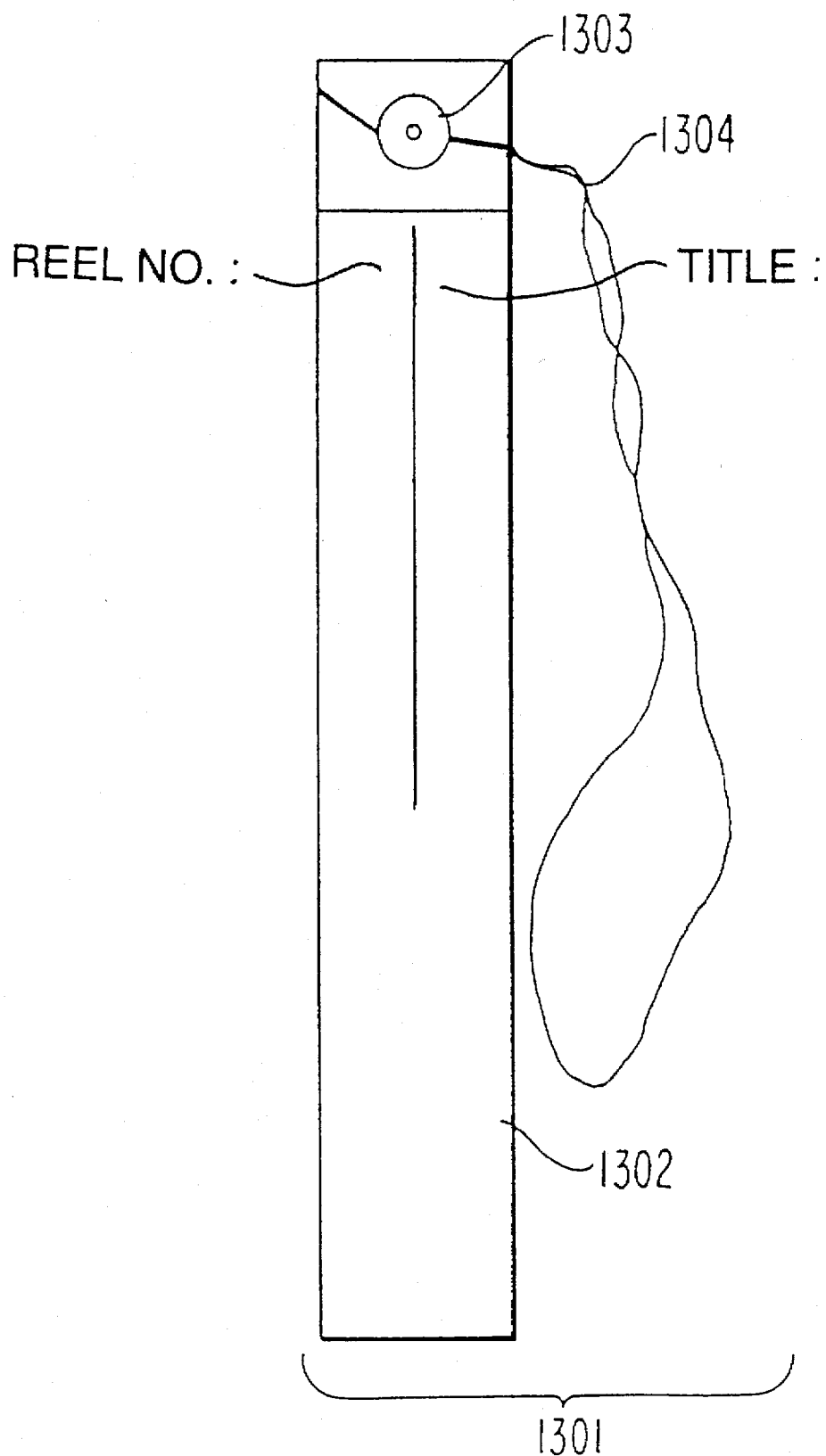
FIG. 13 is a button and string tie for covering or containing a reel of film.

FIGS. 8–13 respectively represent various containers wherein a preservation article is integral with the container, wherein the preservation article is positioned on the surface of a container optionally with an adhesive, or wherein an adsorbent and alkaline solution is applied to a surface of the container and dried. FIG. 8 shows an envelope 801 for holding an archival article 802, such as a photographic negative. FIG. 9 shows a box 901 for holding individual containers or compartments 902 which may include photographic slides, specimens or artifacts. FIG. 10 shows a file folder 1001. FIG. 11 shows a box for storing or transporting 1101. FIG. 12 shows an interleaving paper 1201 inserted between the pages of a book 1202. FIG. 13 shows a button and string tie 1301 which acts as a protective covering to contain or fasten a reel of film. A strip of material 1302, preferably paper, may wrap around a film which is wound on a reel and is secured by a string 1304 attached to a button 1303 at one end and may be wrapped around the button 1303 at the other end.

Figure 14:
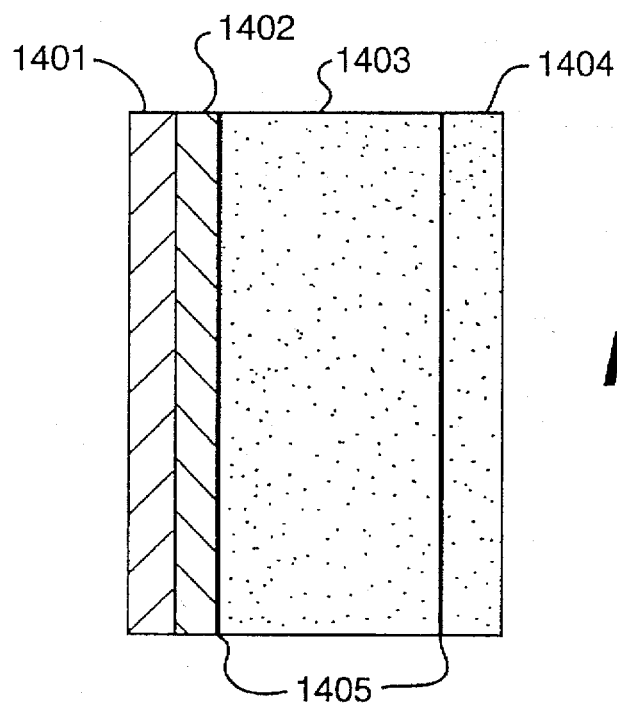
FIG. 14 is a side view of a picture framing mounting board for displaying an archival article, such as a painting.
Figure 15:
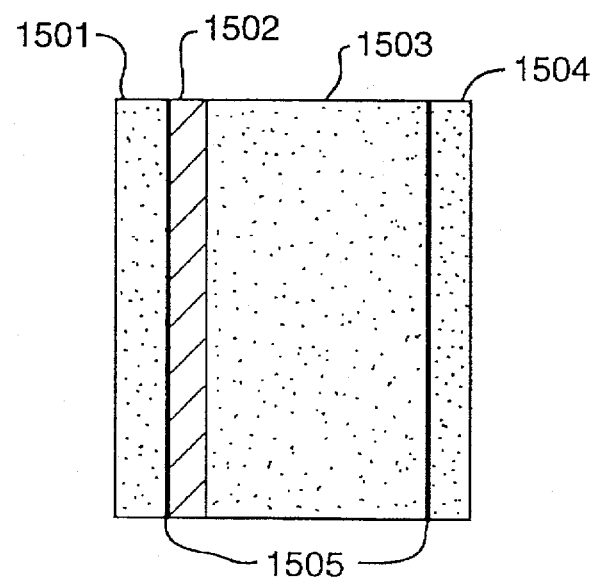
FIG. 15 is a side view of a picture framing mat board for displaying an archival article, such as a painting.

FIGS. 14 and 15 represent supports which contain preservation layers. FIG. 14 is a side view of a picture framing mounting board for displaying an archival article, such as a painting. Layer 1401 contains one or more zeolites and one or more alkaline buffers or deacidifying agents, and is approximately 0.005 to 0.006" thick. At least one of the zeolites in layer 1401 is a molecular sieve having the characteristic(s) of being organophilic, hydrophobic and/or acid-resistant. Layer 1402 contains activated carbon and alkaline buffers, and is approximately 0.004 to 0.005" thick. Layer 1403 contains one or more alkaline buffers or deacidifying agents and is approximately 0.030" thick. Layer 1404 contains one or more alkaline buffers and is 0.010 thick. Layer 5 is an adhesive which bonds the adjacent layers.

FIG. 15 is a side view of a picture framing mat board for displaying an archival article, such as a painting. Layer 1501 contains one or more alkaline buffers or deacidifying agents, may be white or colored, and is approximately 0.010" thick. Sublayers 1502 and 1503 form a single layer which may be made on a cylinder machine, or another paper machine which is capable of producing a single layer of paper having sublayers with different compositions. Sublayer 1502 is a mixture of one or more zeolites and one or more alkaline buffers or deacidifying agents, and is approximately 0.040" thick. At least one of the zeolites in layer 1502 is a molecular sieve having the characteristic(s) of being organophilic, hydrophobic and/or acid-resistant. Sublayer 1503 contains one or more alkaline buffers or deacidifying agents. Layer 1504 contains one or more alkaline buffers or deacidifying agents, may be white or colored and is approximately 0.010" thick. Layer 1505 is an adhesive which bonds the adjacent layers.

Figure 16:
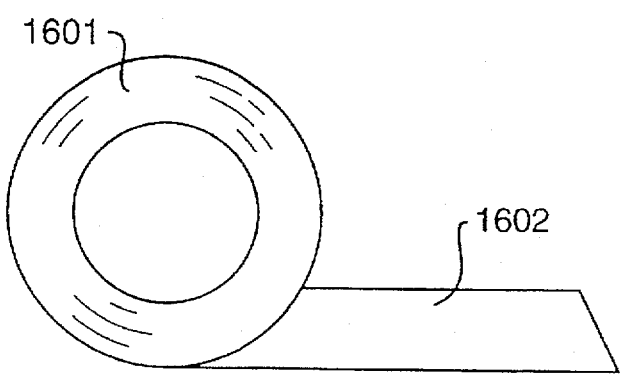
FIG. 16 is a roll of preservation tape.

FIG. 16 is a preservation tape 1601 which has an adhesive on at least one side 1602 to adhere to a surface in the environment of an archival article or directly on an archival article.

The following examples are illustrative of the invention.

EXAMPLES

Samples 1-9

In Samples 1-9, the effects of a composition comprising an alkaline buffer or deacidifying agent, an adsorbent or a combination thereof were tested in experiments involving the preservation of alkaline paper samples in an accelerated aging process. A molecular sieve having the characteristics of being organophilic, hydrophobic, and or acid-resistant could have been used as the adsorbent or as a part of the adsorbent. In these experiments, individual sheets comprising cellulose fibers and optionally including the adsorbent and/or the buffer were prepared by forming a slurry of a fiber blend and the adsorbent and/or the buffer, and dispersing the slurry in water. The diluted and dispersed slurry was then placed in a sheet mold. This sheet mold had a wire mesh screen at its base. The slurry in the sheet mold was mildly agitated, and the sheet mold was then drained. As the water drained through the wire mesh screen, the fiber and the adsorbent and/or buffer was collected as a mat on the screen. Next, a blotter was placed on the resulting wet fiber mat in order to remove excess water. The blotter was then used to peel the fiber mat away from the wire mesh screen. Next, the mat was sandwiched between two cloth felts and mechanically pressed to remove water. The pressed mat was then dried on a dryer can to form a sheet having a moisture content of between five and ten percent.

Nine paper samples, having the adsorbent and buffer content specified in the following table, were prepared according to the above-noted procedure. The porosity of samples 1–9 was measured by determining the amount of time required to force 100 cc of air through the samples. The results of these measurements are shown in the following table.

Each of these samples was then tested by placing one sheet of the sample in a metallized polyester container, along with five sheets of paper from a book. The book paper had an alkaline pH. After sealing the samples and the book paper inside of the metallized polyester container, the sealed container was aged for 88 hours at a temperature of 100° C.

The book paper was then removed from the polyester container and subjected to various tests. The tensile strength, elongation, resistance to repeated folding under load and the pH of the book papers were measured. The tensile strength of the aged book papers was measured using an Instron pendulum type tester by following Tappi method T 404 om 87. The resistance of the book paper to repeated folding under load was measured by using the standard MIT fold test. In this test, the sheets of book paper were placed under a 1 kg. load. The sheets of paper were repeatedly folded through opposing 180° angles until they failed. The data in the following table represents the average number of folds which the paper endured prior to tearing The pH of the book paper was measured by grinding a sample of the book paper and mixing it with 200 ml of deionized water. The pH of the mixture was then measured using a Fisher Accumet Model 630 pH meter calibrated with a buffer at a pH of 4, 7 and 10.

The fold data shown in this table demonstrates that samples containing buffer are effective in preserving book paper. Samples containing a combination of adsorbent and buffer are substantially and unexpectedly more effective at preserving the book paper than those samples containing either of the adsorbent or the buffer alone. The synergistic benefits produced by the combination of the adsorbent and the buffer are substantially greater than what would have been predicted by simply combining the improvements produced by using either the adsorbent or the buffer alone.

The beneficial effects produced by the combination of adsorbent and buffer are particularly surprising because alkaline book paper is generally quite resistant to decomposition. Thus, it would not have been expected that such a substantial reduction in the decomposition of the book paper would have been achieved.

| Paper Sample | % Actv. C | % CaCO$_3$ | Porosity | Tensile | Elongation | MIT Fold 1 Kg. Load | pH T-cold |
|---|---|---|---|---|---|---|---|
| 1 | 20 | 0 | 44 | 7.23 | 3.73 | 4.4 | 7.39 |
| 2 | 0 | 3 | 95 | 6.55 | 3.54 | 4.0 | 7.13 |
| 3 | 0 | 0 | 92 | 7.15 | 3.58 | 3.5 | 7.40 |
| 4 | 0 | 3 | 34 | 7.40 | 3.95 | 4.0 | 7.40 |
| 5 | 20 | 3 | 15 | 7.40 | 3.95 | 7.8 | 7.52 |
| 6 | 0 | 0 | 40 | 5.72 | 3.12 | 2.6 | 7.47 |
| 7 | 15 | 3 | 15 | 7.47 | 3.79 | 6.6 | 7.75 |
| 8 | 10 | 3 | 9 | 7.33 | 3.89 | 5.2 | 7.75 |
| 9 | 5 | 3 | 10 | 6.88 | 3.71 | 5.0 | 7.15 |

Samples 10–15

Samples 10–21 exhibit various combinations of alkaline buffers and adsorbents which may be employed in multi-layered preservation articles. A molecular sieve having the characteristics of being organophilic, hydrophobic, and or acid-resistant could be used as the adsorbent or as a part of the adsorbent. The samples demonstrate the wide variety of combinations and amounts of alkaline buffers and adsorbents which may be incorporated in multi-layered preservation articles. The thickness of the layers may vary. For example, a typical envelope paper may be 0.004" to 0.012" thick, and more preferably may range from 0.005" to 0.007" thick. The layers may include a substrate of any suitable material, such as paper. All values are approximate values and percentages are by weight based on the total weight of the layer in which the component is contained.

Sample 10

Layer 1: 15% zeolites and 3–5% alkaline buffer(s);

Layer 2: 20% mixture of activated carbon, calcium carbonate and, optionally, zinc oxide and/or magnesium carbonate; and Layer 3 (protective layer): neutral pH paper having 15% zeolites and no added alkaline buffer.

Sample 11

Layer 1: 15% zeolites and 3–5% alkaline buffer(s);

Layer 2: 20% mixture of activated carbon, calcium carbonate and, optionally, zinc oxide and/or magnesium carbonate; and Layer 3 (protective layer): neutral pH paper having no added adsorbent and no added alkaline buffer.

Sample 12

Layer 1: 20% mixture of activated carbon and calcium carbonate and, optionally, zinc oxide, magnesium carbonate and/or zeolites; and Layer 2 (protective layer): neutral pH paper having 15% zeolites and no added alkaline buffer.

Sample 13

Layer 1: 15–25% mixture of zeolites, calcium carbonate and, optionally, zinc oxide and/or magnesium carbonate; and Layer 2 (protective layer): neutral pH paper having 15% zeolites and no added alkaline buffer.

Sample 14

Layer 1: 20% mixture of activated carbon, calcium carbonate and, optionally, zinc oxide and/or magnesium carbonate; and Layer 2 (protective layer): neutral pH paper having 15% zeolites and no added alkaline buffer.

Sample 15

Layer 1: 15–20% mixture of zeolites, calcium carbonate and, optionally, zinc oxide and/or magnesium carbonate; and Layer 2 (protective layer): neutral pH paper having no added adsorbents and no added alkaline buffer.

Sample 16

Layer 1: 20% mixture of activated carbon, calcium carbonate, and optionally, zinc oxide and/or magnesium carbonate; and Layer 2: 15% zeolites and 3–5% alkaline buffer(s).

Sample 17

Layer 1: 15% zeolites and 3–5% alkaline buffer(s); and

Layer 2: 20% mixture of activated carbon, calcium carbonate and, optionally, zinc oxide and/or magnesium carbonate.

Sample 18

Layer 1: 20% activated carbon and 5% alkaline buffer(s); and

Layer 2: 15% Purmol 4A and Purmol 5A (zeolites) and 5% alkaline buffer(s).

Sample 19

Layer 1: mixture of zeolites and alkaline buffer(s);

Layer 2: mixture of activated carbon and alkaline buffer(s); and

Layer 3: mixture of zeolites and alkaline buffer(s).

Sample 20

Layer 1 (single layer): mixture of activated carbon and alkaline buffer(s) and, optionally, zeolites.

Sample 21

Layer 1: an alkaline buffer or mixture of 2 or 3 alkaline buffers;

Layer 2: mixture of activated carbon and zeolite and, optionally, alkaline buffer(s); and Layer 3: non-buffered or an alkaline buffer or a mixture of 2 or 3 alkaline buffers.

Any of the above Samples 10–21 may be laminated to other materials, such as paper or cardboard, to build up a paperboard thickness which is suitable for uses where more strength and durability is required, such as a storage box. For example, any of Samples 10–21 may be laminated to a layered material to form multi-layered material:

Layer 1: 0.10" tan buffered paper

Layer 2: 0.023" buffered paper

Layer 3: 0.023" buffered paper

Layer 4: 0.001" to 0.05" of any of Samples 10–20.

Any of the above layers may have a substantially higher or lower thickness, depending on the materials in the layer. For example, a layer having a substrate of corrugated cardboard may have a much greater thickness than those listed above.

ANSI EXPERIMENTS

The preservation ability of the following comparative samples 1–15 and inventive samples 1–19 was determined by the ANSI test. The ANSI test involves the measurement of oxidation resistance provided by a preservation article for an archival article placed in peroxide incubation.

Each sample was prepared by placing a piece of Kodak Technical Pan fine grain silver image emulsion film ("the negative") on a glass slide. The emulsion side of the negative was placed away from the surface of the glass side. The preservation article was then place over the negative and held on the glass with double sided tape and linen tape.

Each sample was placed in an enclosed jar having a mixing fan for air circulation and sealed. The temperature inside the jar was maintained at approximately 50° C. with a laboratory oven, and salts were employed to regulate the humidity inside the jar at approximately 80% RH. The atmosphere in the jar was controlled to have about 2000 ppm hydrogen peroxide from a 2% peroxide solution. The mixing fan was run only for approximately the first hour.

After the exposure to the hydrogen peroxide, the sample was removed from the jar, and the negatives were redeveloped with Kodak Technidol liquid developer. The redeveloped negatives were measured for density gain, which was determined by the difference between the density measurement before the negatives were tested and after the negatives were tested. Density was determined by the measurements from a Macbeth PD-903 desitometer. For each test, four or five different areas on each negative were measured. A gain in density indicates damage, and a density gain greater than approximately 0.04 fails the test.

In the following examples summarized in Tables I and II, the buffered papers have an alkaline pH of approximately 8.5; N/C means no change in density; PCB-G, WPH and FCA, produced by Calgon Carbon Corporation, are activated carbons; Purmol 4A, Purmol 5A and Purmol 13A, produced by Zeochem, are zeolites; and $CaCO_3$, $MgCO_3$ and ZnO are alkaline buffers. All percentages are percent weight of the total weight of the layer. Papers are identified in terms of pounds (lb), indicating the weight in pounds per 500 sheets of 24"×36" paper.

TABLE I

| Comparative Sample No. | Composition of Paper | Number of Test Cycles | Total Hours | Density Change Area: 1 | 2 | 3 | 4 | 5 |
| --- | --- | --- | --- | --- | --- | --- | --- | --- |
| 1 | 66 lb, 3% $CaCO_3$ | 7 | 126 | +1.66 | +1.36 | +2.98 | +3.09 | |
| 2 | 66 lb, 3% $CaCO_3$ | 7 | 126 | +1.24 | +1.01 | +2.09 | +2.06 | |
| 3 | 66 lb, non-buffered, pH 7 | 7 | 126 | +1.48 | +0.39 | +2.03 | +1.95 | +2.05 |
| 4 | 66 lb, non-buffered, pH 7 | 9 | 162 | +1.38 | +0.42 | +2.19 | +2.09 | +2.28 |
| 5 | 66 lb, 3% $CaCO_3$ | 9 | 162 | +1.84 | +0.64 | +2.14 | +2.29 | +1.98 |
| 6 | 165 lb, non-buffered, pH 7 | 1 | 18 | +0.11 | +0.70 | +0.53 | +0.86 | +0.46 |
| 7 | 66 lb, 3% $CaCO_3$ | 9 | 162 | +1.84 | +0.64 | +2.14 | +2.29 | +1.98 |
| 8 | 252 lb, acid-free, buffered | 1 | 18 | +0.90 | +0.82 | +0.82 | +0.53 | |
| 9 | 324 lb, acid-free, buffered | 1 | 18 | +0.82 | +0.70 | +0.46 | +0.38 | |
| 10 | 140 lb, 3% $CACO_3$ | 1 | 18 | +0.22 | +0.07 | +0.18 | +0.19 | |
| 11 | 165 lb, non-buffered, pH 7 | 1 | 18 | +0.30 | +1.06 | +0.89 | +1.10 | +0.67 |
| 12 | 66 lb, 3% $CaCO_3$ | 1 | 18 | +0.40 | +0.43 | +0.06 | +0.19 | |
| 13 | 140 lb, non-buffered, pH 7 | 1 | 18 | +0.64 | +0.63 | +0.37 | +0.37 | |
| 14 | 220 lb, 3% $CaCO_3$ | 1 | 18 | +0.22 | +0.34 | +0.38 | +0.43 | +0.49 |
| 15 | 440 lb, 3% $CaCO_3$ | 1 | 18 | +0.14 | +0.38 | +0.36 | +0.51 | +0.54 |

TABLE II

| Inventive Sample No. | Composition of Paper | Number of Test Cycles | Total Hours | Density Change Area: 1 | 2 | 3 | 4 | 5 |
| --- | --- | --- | --- | --- | --- | --- | --- | --- |
| 1 | 70 lb, 25% PCB-G, 5% $CaCO_3$ | 12 | 216 | N/C | N/C | N/C | N/C | |
| 2 | 70 lb, 25% PCB-G, 5% $CaCO_3$ | 11 | 198 | N/C | N/C | N/C | N/C | |
| 3 | 45 lb, 18% PCB-G, 54 CbCO3 | 9 | 162 | N/C | N/C | N/C | N/C | |
| 4 | 39 lb, 12% PCB-G, 54 $CaCO_3$ | 10 | 180 | N/C | N/C | N/C | N/C | |
| 5 | 39 lb, 12% PCB-G, 54 CdCO3 | 1 | 18 | N/C | N/C | N/C | N/C | |
| 6 | 45 lb, 18% PCB-G, 5% CAC03 | 1 | 18 | N/C | N/C | N/C | N/C | |
| 7 | 39 lb, 12% PCB-G, 5% $CaCO_3$ | 2 | 36 | N/C | N/C | N/C | N/C | |
| 8 | 70 lb, center layer: 15% PCO-G, 3% $CaCO_3$, 5% Purmol 4A; top and bottom layers: 3% $CaCO_3$ | 1 | 18 | N/C | N/C | N/C | N/C | |
| 9 | 70 lb, 15% PCB-G, 3% $CaCO_3$, 5% Purmol 4A | 1 | 18 | N/C | N/C | N/C | N/C | |
| 10 | 190 lb, center layer: 20% FCA, 5% ZnO; top and bottom layers: | 1 | 18 | N/C | N/C | N/C | N/C | |

TABLE II-continued

| Inventive Sample No. | Composition of Paper | Number of Test Cycles | Total Hours | Area: | Density Change 1 | 2 | 3 | 4 | 5 |
|---|---|---|---|---|---|---|---|---|---|
| | 3% CaCO₃, 15% Pursor 4A | | | | | | | | |
| 11 | 190 lb, 15% Purmol 4A, 3% CaCO₃ | 1 | 18 | | N/C | N/C | N/C | N/C | |
| 12 | 45 lb, 18% PCB-G, 5% CaCO₃ | 6 | 108 | | N/C | N/C | N/C | N/C | |
| 13 | 45 lb, 18% PCB-G, 5% CaCO₃ | 8 | 144 | | N/C | N/C | N/C | N/C | |
| 14 | 70 lb, center layer: 20% WPH, 5% CaCO₃; top and bottom layer: neutral pH, non-buffered paper | 8 | 144 | | N/C | N/C | N/C | N/C | |
| 15 | 190 lb, 15% Purmol 4A, 34 CaCO₃ | 2 | 36 | | N/C | N/C | N/C | N/C | |
| 16 | 39 lb, 12% PCB-G, 54 CaCO₃ | 4 | 72 | | N/C | N/C | N/C | N/C | |
| 17 | 190 lb, center layer: 20% FCA, 5% ZnO, top and bottom layer: 3% CaCO₃, 15% Pursol 4A | 8 | 144 | | N/C | N/C | N/C | N/C | |
| 18 | 45 lb, 18% PCB-G, 5% CaCO₃ | 8 | 144 | | N/C | N/C | N/C | N/C | |
| 19 | 70 lb, 25% PCB-G, 5% CaCO₃ | 8 | 144 | | N/C | N/C | N/C | N/C | |

As summarized in the above Tables I and II, all of the comparative samples showed a change in density well over the unacceptable density change limit of approximately 0.04. The preservation articles of the present invention, however, not only passed, but registered no change (N/C) in density.

It will be apparent to those skilled in the art that various modifications and variations can be made in the invention without departing from the scope or spirit of the invention. Thus, it is intended that the invention cover the modifications and variations of this invention provided they come within the scope of the appended claims and their equivalents.

What is claimed is:

1. A preserved archival article comprising an archival article in combination with a preservation article, such that said archival article is placed in contact with or in close proximity to said preservation article and wherein said preservation article comprises, contained within a paper material:
   a molecular sieve which is organophilic, hydrophobic, or acid-resistant to selectively remove chemical components from the environment of the archival article to preserve the archival article.

2. A preserved article of claim 1, wherein said molecular sieve is organophilic.

3. A preserved article of claim 1, wherein said molecular sieve is hydrophobic.

4. A preserved article of claim 1, wherein said molecular sieve is acid-resistant.

5. The preserved article of claim 1, further comprising an alkaline buffer or deacidifying agent.

6. The preserved article of claim 5, wherein said alkaline buffer or deacidifying agent is calcium carbonate, magnesium carbonate, magnesium bicarbonate, zinc oxide, zinc carbonate or a mixture thereof.

7. The preserved article of claim 5, wherein said alkaline buffer or deacidifying agent is an adsorbent which also acts as an alkaline buffer or deacidifying agent.

8. The preserved article of claim 1, further comprising an adsorbent.

9. The preserved article of claim 8, wherein said adsorbent is activated carbon, a modified activated carbon, a molecular sieve, or a mixture thereof.

10. The preserved article of claim 9, wherein said modified activated carbon is activated carbon treated with copper or chromium.

11. The preserved article of claim 1, wherein said preservation article is in the form of a sheet.

12. The preserved article of claim 11, wherein said preservation article is in the form of a container formed from said sheet.

13. The preserved article of claim 12, wherein said container is a box.

14. The preserved article of claim 12, wherein said container is an envelope.

15. The preserved article of claim 12, wherein said container is a folder.

16. The preserved article of claim 1, wherein said preservation article is in the form of a packaging material.

17. The preserved article of claim 16, wherein said packaging material is a wrapping paper.

18. The preserved article of claim 16, wherein said packaging material is a shredded paper.

19. The preserved article of claim 16, wherein said packaging material is a lining paper.

20. The preserved article of claim 16, wherein said packaging material is an interleaving paper.

21. The preserved article of claim 16, wherein said packaging material is a foam cushioning material.

22. The preserved article of claim 16, wherein said packaging material is a tape having an adhesive on at least one side.

23. The preserved article of claim 11, wherein said preservation article is in the form of a support formed from said sheet.

24. The preserved article of claim 23, wherein said support is a mounting board.

25. The preserved article of claim 23, wherein said support is a framing board.

26. The preserved article of claim 23, wherein said support is a corrugated board.

27. The preserved article of claim 1, wherein said preservation article is integral with said archival article.

28. The preserved article of claim 1, wherein at least a portion of said preservation article is in the form of particles.

29. The preserved article of claim 28, wherein said particles are contained in a packet.

30. The preserved article of claim 28, wherein said particles are contained in a compartment.

31. The preserved article of claim 30, wherein said compartment is integral with a container for an archival article.

32. The preserved article of claim 28, wherein said particles are contained on an interchangable pad.

33. The preserved article of claim 1, wherein at least a portion of said preservation article is coated on a surface.

34. The preserved article of claim 33, wherein said surface is a surface of an archival article.

35. The preserved article of claim 33, wherein said surface is a surface of a container.

36. The preserved article of claim 33, wherein said surface is a surface of a packaging material.

37. The preserved article of claim 33, wherein said surface is a surface of a support.

38. The preserved article of claim 1, wherein said preservation article comprises one or more layers, and further wherein said molecular sieve which is organophilic, hydrophobic or acid-resistant is in at least one of said layers.

39. The preserved article of claim 38, wherein said molecular sieve which is organophilic, hydrophobic or acid-resistant is dispersed in a single layer.

40. The preserved article of claim 5, wherein said preservation article comprises one or more layers, and further wherein said molecular sieve which is organophilic, hydrophobic or acid-resistant and said alkaline buffer or deacidifying agent is contained in at least one of said layers.

41. The preserved article of claim 40, wherein said molecular sieve which is organophilic, hydrophobic or acid-resistant and said alkaline buffer or deacidifying agent are interspersed in a single layer.

42. The preserved article of claim 40, wherein said alkaline buffer or deacidifying agent and said molecular sieve which is organophilic, hydrophobic or acid-resistant are contained in two distinct layers.

43. The preserved article of claim 38, further comprising a protective layer which is positioned between said archival article and the other layers of the preservation article.

44. The preserved article of claim 43, wherein said protective layer is substantially free of said molecular sieve which is organophilic, hydrophobic or acid-resistant.

45. The preserved article of claim 43, wherein said protective layer comprises an alkaline buffer or deacidifying agent.

46. The preserved article of claim 38, wherein one or more of said layers comprises a substrate of a fibrous, woven or non-woven material.

47. The preserved article of claim 46, wherein said substrate comprises a textile, paper, wood, metal, glass, cellulose, cotton, foam, plastic or combination of these.

48. The preserved article of claim 1, further comprising a water or water vapor absorbent.

49. The preserved article of claim 48, wherein said water or water vapor absorbent is a silica gel.

50. The preserved article of claim 1, wherein said preservation article further comprises a flame resistant material.

51. The preserved article of claim 1, wherein said preservation article further comprises a vapor barrier.

52. The preserved article of claim 51, wherein said vapor barrier comprises polyester or metallized polyester.

53. The preserved article of claim 1, wherein said preservation article further comprises an indicator which signals a change in the atmosphere of said archival article.

54. The preserved article of claim 1, wherein said preservation article further comprises an indicator which signals a change in the condition of said preservation article.

55. A preserved archival article comprising an archival article in combination with a preservation article, such that said archival article is placed in contact with or in close proximity to said preservation article and wherein said preservation article comprises, contained within a paper material:

a first layer comprising a substrate and at least one alkaline buffer or deacidifying agent in said substrate and a second layer comprising a substrate and a molecular sieve which is organophilic, hydrophobic, or acid-resistant in said substrate, wherein said alkaline buffer or deacidifying agent neutralizes or removes acidic components from the environment of the archival article and wherein said molecular sieve removes chemical components from the environment of the archival article.

56. A preserved article of claim 55, wherein said molecular sieve is organophilic.

57. A preserved article of claim 55, wherein said molecular sieve is hydrophobic.

58. A preserved article of claim 55, wherein said molecular sieve is acid-resistant.

59. A preserved article of claim 55, wherein the density of said first layer is different than the density of said second layer.

60. A preserved article of claim 55, wherein the density of said first layer is substantially different than the density of said second layer.

61. A preserved article of claim 55, wherein said first layer further comprises at least one adsorbent.

62. A preserved article of claim 55, wherein said second layer further comprises at least one alkaline buffer or deacidifying agent.

63. A preserved article of claim 55, further comprising at least one additional layer comprising a substrate and an adsorbent, an alkaline buffer, a deacidifying agent or a mixture of these.

* * * * *